United States Patent [19]

Nakazawa et al.

[11] Patent Number: 5,444,506
[45] Date of Patent: Aug. 22, 1995

[54] PROJECTION ORIGINAL FILM FEEDING APPARATUS

[75] Inventors: Noriaki Nakazawa; Hideaki Furukawa, both of Yokohama; Kenji Kobayashi, Tokyo; Hiromichi Tsujino, Yokohama, all of Japan

[73] Assignees: Canon Aptex Inc., Ibaraki; Canon Kabushiki Kaisha, Tokyo, both of Japan

[21] Appl. No.: 47,489

[22] Filed: Apr. 19, 1993

[30] Foreign Application Priority Data

| Apr. 20, 1992 | [JP] | Japan | 4-128212 |
| Apr. 20, 1992 | [JP] | Japan | 4-128213 |
| Apr. 20, 1992 | [JP] | Japan | 4-128214 |
| Apr. 20, 1992 | [JP] | Japan | 4-128215 |
| Apr. 20, 1992 | [JP] | Japan | 4-128216 |
| Apr. 20, 1992 | [JP] | Japan | 4-128217 |

[51] Int. Cl.[6] .................................. G03B 23/00
[52] U.S. Cl. .................................. 353/104; 353/103; 353/108
[58] Field of Search .............. 363/26 A, 26 R, 103, 363/104, 108, 109, 120, 122, DIG. 2, DIG. 3, DIG. 5

[56] References Cited

U.S. PATENT DOCUMENTS

| 4,707,092 | 11/1987 | Mindell | 353/109 |
| 4,942,411 | 7/1990 | Polston | 353/DIG. 5 |
| 4,944,586 | 2/1990 | Rightmyre | 353/108 |
| 5,172,145 | 12/1992 | Stephenson | 353/DIG. 5 |

FOREIGN PATENT DOCUMENTS

| 0202442 | 11/1984 | Japan | 353/DIG. 5 |
| 0258437 | 11/1987 | Japan | 353/DIG. 5 |
| 0259633 | 10/1990 | Japan | 353/103 |
| 4307531 | 10/1992 | Japan | 353/103 |

Primary Examiner—William A. Cuchlinski, Jr.
Assistant Examiner—William C. Dowling
Attorney, Agent, or Firm—Fitzpatrick, Cella, Harper & Scinto

[57] ABSTRACT

A projection original film feeding apparatus is provided with a feeder for feeding original film to a projecting position, a sizer for outputting size information of the original film, and a controller for varying the amount of feed the original film by the feeder to conform with the size information from the sizer and setting the original film at a regular projecting position for each size irrespective of the size.

24 Claims, 17 Drawing Sheets

FIG.8A

TRANSMISSION CODE CONSTRUCTION

| SYSTEM CODE | DATA CODE | EXPANSION CODE |
|---|---|---|
| C1  C2  C3  C4  C5 | C6  C7  C8  C9  C10 C11 | C12  C13  C14 |
| 1    0    0    0    1 | REFER TO  (2) | 1    1    0 |

FIG.8B

KEY AND DATA CODE

| No. | KEY | C6 | C7 | C8 | C9 | C10 | C11 |
|---|---|---|---|---|---|---|---|
| B1 | ONE SHEET FEED BUTTON | 1 | 0 | 0 | 0 | 0 | 0 |
| B2 | ONE SHEET RETURN BUTTON | 0 | 1 | 0 | 0 | 0 | 0 |
| B3 | FINE FEED BUTTON | 1 | 1 | 0 | 0 | 0 | 0 |
| B4 | FINE RETURN BUTTON | 0 | 0 | 1 | 0 | 0 | 0 |
| B5 | SHEET DISCHARGE BUTTON | 1 | 0 | 1 | 0 | 0 | 0 |
| B6 | PRESET BUTTON | 0 | 1 | 1 | 0 | 0 | 0 |
| B7 | STOP BUTTON | 1 | 1 | 1 | 0 | 0 | 0 |
| B8 | ILLUMINATION BUTTON | 0 | 0 | 0 | 1 | 0 | 0 |
| B9 | SOUND VOLUME BUTTON | 1 | 0 | 0 | 1 | 0 | 0 |
| B10 | AIR CONDITION BUTTON | 0 | 1 | 0 | 1 | 0 | 0 |
| B11 | LIGHT BUTTON | 1 | 1 | 0 | 1 | 0 | 0 |
| B12 | LASER POINTER BUTTON | | | | | | |

FIG.8C

KEY AND RECIEPT AND FUNCTION

| No. | KEY | D3 | D2 | D1 | D0 | FUNCTION |
|-----|-----|----|----|----|----|----------|
| B1  | ONE SHEET FEED BUTTON | 1 | 0 | 0 | 0 | FEED OF ONE SHEET |
| B2  | ONE SHEET RETURN BUTTON | 0 | 1 | 0 | 0 | RETURN OF ONE SHEET |
| B3  | FINE FEED BUTTON | 1 | 1 | 0 | 0 | FINE FEED OF SHEET |
| B4  | FINE RETURN BUTTON | 0 | 0 | 1 | 0 | FINE RETURN OF SHEET |
| B5  | SHEET DISCHARGE BUTTON | 1 | 0 | 1 | 0 | DISCHARGE OF SHEET |
| B6  | PRESET BUTTON | 0 | 1 | 1 | 0 | PRESET |
| B7  | STOP BUTTON | 1 | 1 | 1 | 0 | INTERRUPTION OF OPERATION |
| B8  | ILLUMINATION BUTTON | 0 | 0 | 0 | 1 | ON/OFF OF ILLUMINATION EQUIPMENT |
| B9  | SOUND VOLUME BUTTON | 1 | 0 | 0 | 1 | ON/OFF OF SPEAKER |
| B10 | AIR CONDITION BUTTON | 0 | 1 | 0 | 1 | ON/OFF OF AIR CONDITION EQUIPMENT |
| B11 | LIGHT BUTTON | 1 | 1 | 0 | 1 | OPEN/CLOSE OF CURTAIN |
| B12 | LASER POINTER BUTTON | — | — | — | — | PUT-ON OF LASER POINTER |

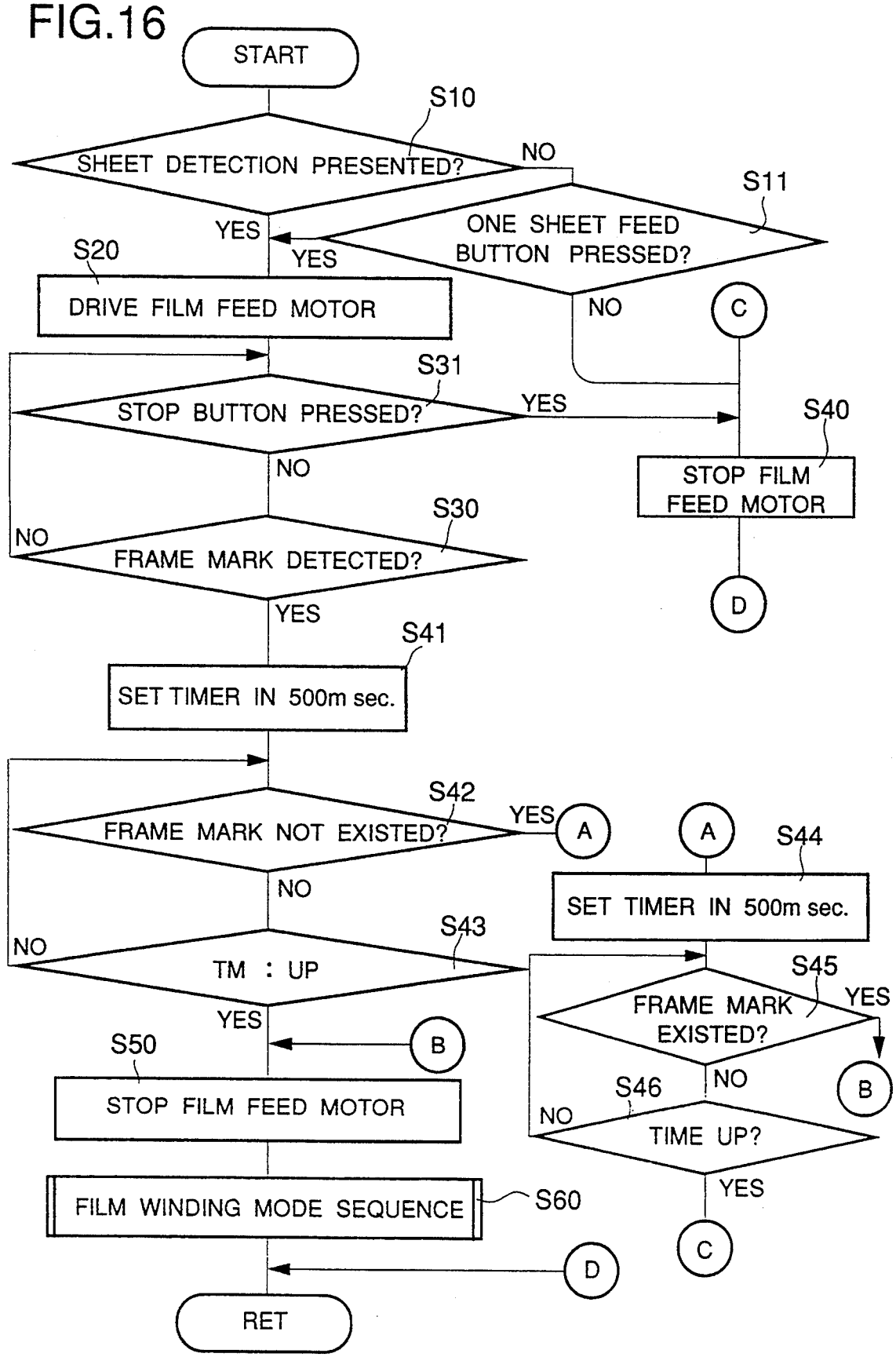

PROJECTION ORIGINAL FILM FEEDING APPARATUS

BACKGROUND OF THE INVENTION

1. Field of the Invention

This invention relates to a projection optical film feeding apparatus and an overhead projector provided with such apparatus, and particularly to an original film feeding apparatus for setting original film at a predetermined location on the platen glass of an OHP apparatus for projecting, for example, original film (OHP film) and an overhead projector equipped with the same.

2. Related Background Art

Generally, in an announcement, a lecture or the like utilizing an OHP apparatus, the speaker writes image information on transparent sheet-like OHP film to thereby prepare original film (hereinafter referred to as the "sheet"), sets this sheet on the platen glass of the OHP apparatus, applies light thereto from below and enlargedly projects the original image onto a front screen. The speaker then stands by the screen and gives an explanation to the audience while pointing at the image enlarged on the screen by the use of a pointing rod or the like. When the explanation of a sheet is ended, the speaker removes this sheet from the platen glass and places a new sheet necessary for the next explanation onto the platen glass. By repeating the removal of an explained sheet and the placement of a new sheet in this manner, the speaker interchanges the sheets prepared and arranged in advance in the order of announcement one after another on the platen glass and makes the explanation of the sheets in succession on the screen.

According to the above-described example of the prior art, however, the speaker approaches the OHP apparatus and talks while interchanging the sheets on the platen glass one after another, and this has led to the following disadvantages:

(1) The OHP apparatus and the screen are usually installed with a distance therebetween and accordingly, during the interchange of the sheets, the speaker needs to move from the screen to the OHP apparatus, and this is inefficient. Therefore, in some cases, the speaker is in constant attendance upon the screen and posts a person for the interchange of the sheets, and the person interchanges the sheets in response to the speaker's sign.

(2) As when answering questions after the announcement, the speaker takes much time to find out a necessary sheet or sheets from among the announced sheets placed in disorder and cannot effectively make the most of the limited announcement time.

(3) When a sheet is to be placed onto the platen glass, the sheet is curled at the four corners thereof and the four corners of the image projected on the screen becomes distorted. Also, the interchange of the sheets is done hastily in a dark place and therefore, the top and bottom or the front and back of a sheet are apt to be mistaken for each other.

SUMMARY OF THE INVENTION

The present invention has been made in view of the above-described example of the prior art and the object thereof is to provide an original film feeding apparatus for automatically setting OHP film at a predetermined position or discharging the OHP film from the predetermined position, and an overhead projector equipped with such apparatus.

To achieve the above object, the apparatus of the present invention is provided with input means for the size of an original sheet (such as the size itself of the sheet or the lateral or vertical position of the sheet), means for feeding the original sheet to a reading position, and means for controlling the original feeding means on the basis of the size information by said input means.

According to the above-described feature of the present invention, in an OHP system provided with an automatic original feeding apparatus for automatically feeding original film (sheet) and stopping it at a predetermined location on platen glass, the original sheet can always be placed at a regular projection position on the OHP apparatus (usually the center of the platen glass). Thereby, the original sheet can be placed on the center of the platen glass without the speaker caring about the placement position of each original sheet on the platen glass.

BRIEF DESCRIPTION OF THE DRAWINGS

FIG. 7A shows the internal construction of a remote control light emitter 5a, and FIG. 7B is a pictorial perspective view of the remote control light emitter 5a.

FIG. 8A shows transmission code construction, FIG. 8B shows the relations between keys and data codes, FIG. 8C shows the relations between the keys and received data and between the keys and functions.

FIG. 16 is a flow chart illustrating the action of the end frame mark of FIG. 15.

DETAILED DESCRIPTION OF THE PREFERRED EMBODIMENTS

Some embodiments of the present invention will hereinafter be described with reference to the drawings.

First Embodiment

Figure 1:
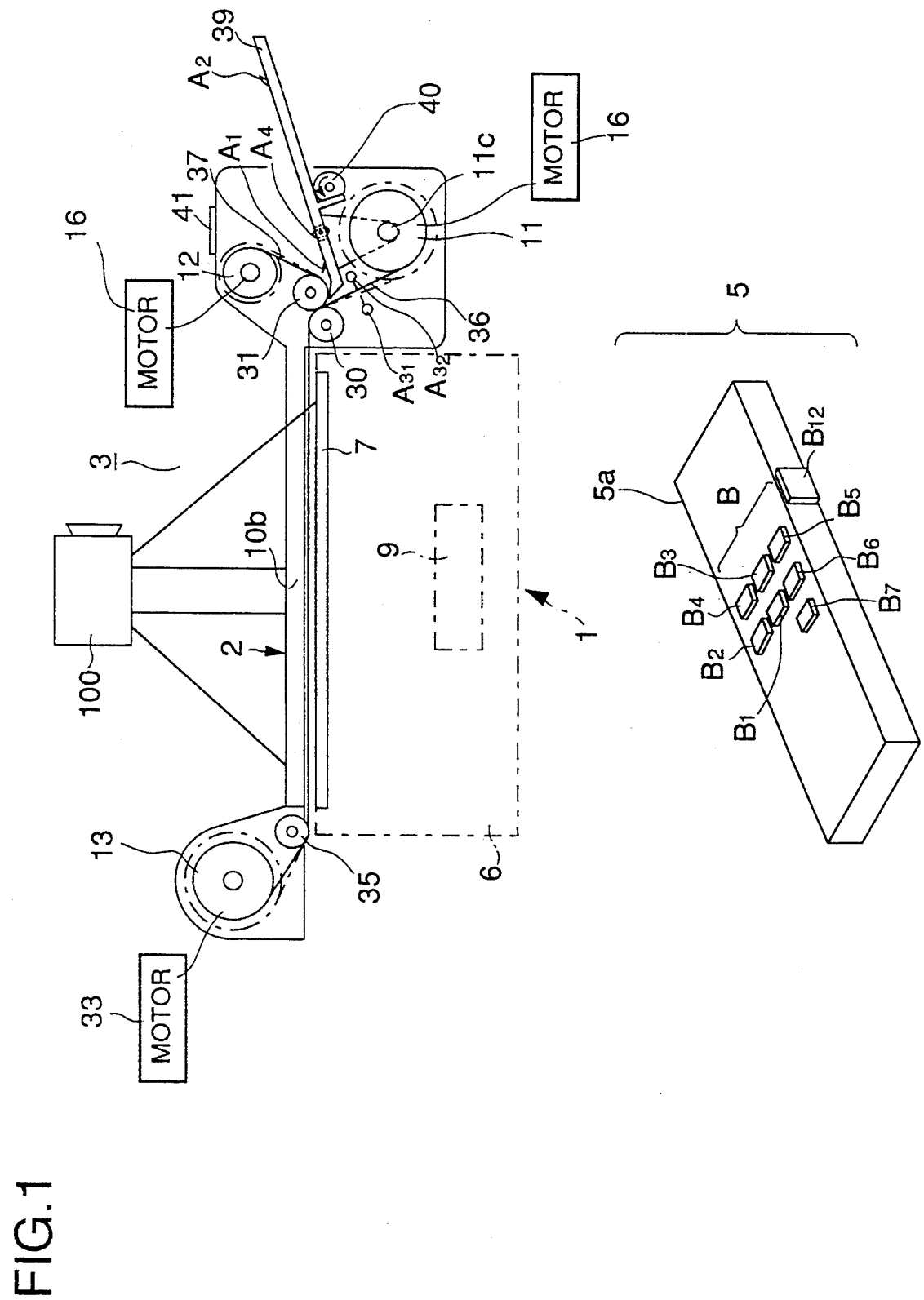
FIG. 1 shows a longitudinal cross-sectional view of an OHP apparatus and a sheet feeder and an enlarged perspective view of a remote control transmitting portion.
Figure 2:
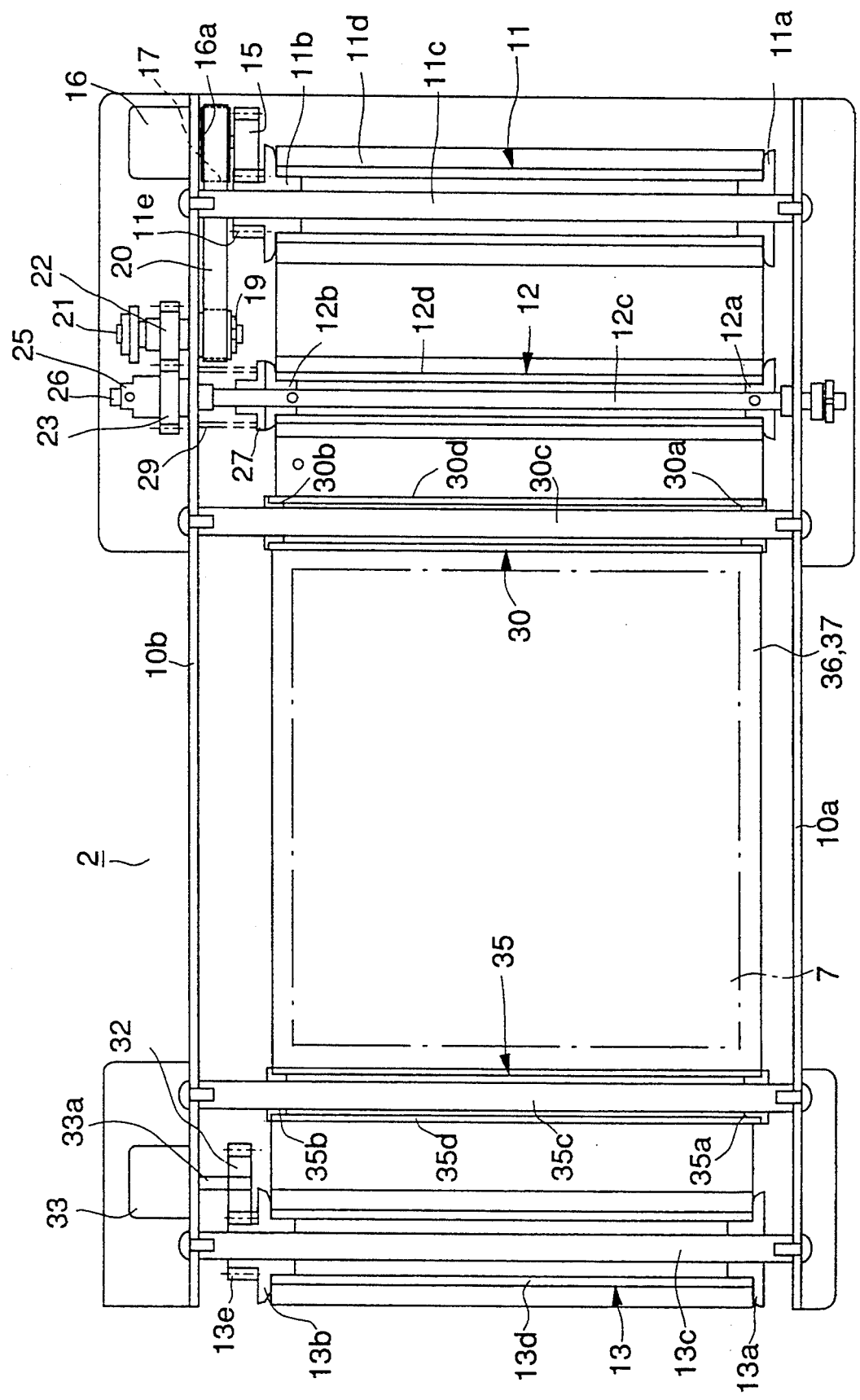
FIG. 2 is a top plan developed view of the construction of the sheet feeder and a driving system.

FIG. 1 shows a longitudinal cross-sectional view of an OHP apparatus 1 and an automatic original feeding device (hereinafter referred to as the "sheet feeder") 2 and an enlarged perspective view of a remote control transmitting portion 5. FIG. 2 is a developed view of a driving system when the sheet feeder 2 is seen from above it. As shown in FIG. 1, an overhead projector 3 is provided with the OHP apparatus 1 and an original film feeding apparatus, which is comprised of the sheet feeder 2 and a remote control transmitting portion 5 as remote control means for remotely controlling the OHP apparatus 1 and the sheet feeder 2. In the ensuing description, it is to be understood that with regard to front, rear, left and right positions, with FIG. 2 which is a top plan view of the sheet feeder 2 as a reference, the lower side thereof is front, the upper side thereof is rear, the left side thereof is left and the right side thereof is right.

The OHP apparatus 1 has an apparatus body 6 formed into a box-like shape, and transparent platen glass 7 is disposed on the upper surface thereof and a light source 9 is disposed therein. The reference numeral 100 designates an irradiating portion for applying light from a sheet original onto a screen.

The sheet feeder 2 is provided with front and rear side places 10a and 10b disposed forwardly and rearwardly, respectively, and opposed to each other, and a number of rollers rotatably supported by these side plates 10a and 10b. A right lower roller 11 and a right upper roller 12 constituting a winding roller as moving means for fed film which will be described later are rotatably disposed on the right-hand portion of the sheet feeder 2, and a left roller 13 constituting a rewinding roller as moving means is rotatably disposed on the left-hand portion of the sheet feeder. The right lower roller 11, as shown in FIG. 2, has a right lower roller front pulley 11a and a right lower roller rear pulley 11b rotatably fitted to the front and rear end portions of a right lower roller shaft 11c having its front and rear ends fixedly supported by the side plates 10a and 10b, and a right lower roller cylinder 11d having the pulleys 11a and 11b fitted to the front and rear end portions thereof. Accordingly, the entire right lower roller 11 is rotatable relative to the right lower roller shaft 11c. A gear portion 11e is formed on the outer side of the right lower roller rear pulley 11b, and a right pulley gear 15 meshing with the gear portion 11e is fixed to the output shaft 16a of a film winding motor 16 comprising a stepping motor. Accordingly, the rotation of the film winding motor 16 as driving means is directly transmitted to the right lower roller 11 through the right pulley gear 15.

A pulley 17 integral with the right pulley gear 15 is fixed to the output shaft 16a of the film winding motor 16, and a belt 20 is passed between this pulley 17 and a pulley 19 forming a pair therewith, whereby the rotating force of the film winding motor 16 is transmitted to a right upper roller 12 which will be described later. The pulley 19 is fixed to a transmission shaft 21 extended outwardly of the rear side plate 10b, and a one-way gear 22 is mounted on the transmission shaft 21 through a one-way clutch (not shown). A right upper gear 23 meshing with the one-way gear 22 is connected to a shaft 26 through a torque limiter 25, and a brake plate 27 is fixed to that portion of the shaft 26 which is inside of the side plate 10b. A brake spring 29 which is a compression spring is interposed between the brake plate 27 and the side plate 10b and inwardly biases the brake plate 27. A right upper roller rear pulley 12b slidingly contacted by the biased brake plate 27 is fixed to the rear end of a right upper roller shaft 12c, and a right upper roller front pulley 12a is fixed to the front end of the right upper roller shaft 12c.

Also, these pulleys 12a and 12b are fitted to the front and rear ends, respectively, of a cylindrical right upper roller cylinder 12d. That is, the power of the film winding motor 16 is transmitted to the right upper roller 12 comprising the right upper roller cylinder 12d as a main constituent member, and the one-way gear 22, the torque limiter 25, the brake plate 27, etc. are interposed between the two and accordingly, with regard to the rotation of the right upper roller 12, design is made such that the drive force is transmitted in one direction and moreover, the transmission of power exceeding a predetermined level is prevented and further, a brake force in the direction opposite to the direction of rotation acts at all times.

Also, with regard to the peripheral velocity of the right upper roller 12 and the peripheral velocity of the aforedescribed right lower roller 11, the speed reduction ratio is set such that (the peripheral velocity of the right upper roller 12) is larger than (the peripheral velocity of the right lower roller 11). These considerations for the right upper roller 12 are given on the basis of the fact that conveying film 36 and keep film 37 which will be described later are moved (conveyed) in both of left and right directions, the fact that the film 36 and film 37 differ in thickness from each other, and the fact that even if the peripheral velocities of the rollers 11 and 12 are constant, the amounts of twining of the film 36 and film 37 on these rollers 11 and 12, i.e., the turn diameters of film rolls, are varied to thereby delicately vary the film conveyance speed. Thereby, smooth conveyance of the film 36 and film 37 is realized.

A lower feed roller 30 and an upper feed roller 31 (see FIG. 1) as sheet feeding means are rotatably disposed between the right upper roller 12 and the right lower roller 11 so as to be in contact with each other. The lower feed roller 30 has pulleys 30a and 30b rotatably fitted to the front end portion and rear end portion, respectively, of a shaft 30c having its front and rear ends supported by the front and rear side plates 10a and 10b, respectively, and these pulleys 30a and 30b are fitted to the front and rear ends, respectively, of a cylindrical lower feed roller cylinder 30d. An upper feed roller 31 is constructed like the lower feed roller 30 and is rotatable, and is urged against the lower feed roller 30 with a suitable force.

The left roller 13 disposed on the left-hand portion of the sheet feeder 2 has a cylindrical left roller cylinder 13d having a left roller front pulley 13a and a left roller rear pulley 13b fitted to the front and rear ends, respectively, thereof, and the left roller cylinder 13d is rotatably supported by a left roller shaft 13c supported by the front and rear side plates 10a and 10b, through the front and rear pulleys 13a and 13b. A gear portion 13e is formed on the rear pulley 13b, and a left pulley gear 32 meshing with this gear portion 13e is secured to the output shaft 33a of a film feeding motor (for example, a stepping motor) 33 as driving means. A left tension roller 35 is disposed rightwardly downwardly of the left roller 13. The left tension roller 35 has its front and rear pulleys 35a and 35b, which are fixed to the front and rear ends, respectively, of a left tension roller cylinder 35d, rotatably supported by a shaft 35c fixedly supported by the front and rear side plates 10a and 10b.

The six rollers 11, 12, 13, 30, 31 and 35 have been described above, and among them, the right lower roller 11, the right upper roller 12 and the left roller 13 are positively driven by the film winding motor 16 or the film feeding motor 33, while the lower feed roller 30, the upper feed roller 31 and the left tension roller 35 are negatively rotated by a rotational force being imparted thereto by the conveying film 36, etc. which will be described below.

The conveying film 36 and keep film 37 as feeding film are passed over these rollers, as shown in FIG. 1. As each of the conveying film 36 and keep film 37, use is made of film excellent in transmittance, for example, PET film or the like, to transmit the light from the light source 9 therethrough with the sheet as the original film sandwiched therebetween. The film 37 and film 36 are superposed one upon the other and twined on the left roller 13 of the sheet feeder 2, are passed over the left tension roller 35, are directed to the nip portion between the lower feed roller 30 and the upper feed roller 31 via the upper surface of the platen glass 7, whereafter they are separated upward and downward, and the conveying film 36 is twined on the right lower roller 11 and the keep film 37 is twined on the right upper roller 12. The film 36 and film 37 are designed such that both when they are wound and when they are rewound, moderate tension is imparted thereto by the left tension roller 35, the lower feed roller 30, the upper feed roller 31, etc.

Further, a sheet feeding table 39 is disposed between the right lower roller 11 and the right upper roller 12 on the right-hand side of the sheet feeder 2. The sheet feeding table 39 is supported for pivotal movement about the aforedescribed right lower roller shaft 11c, and is disposed such that the fore end portion thereof is located near the nip portion between the lower feed roller 30 and the upper feed roller 31. A tray rocking cam 40 is disposed for contact with the underside of the sheet feeding table 39. By this tray rocking cam 40 being rotatively driven, the fore end portion of the sheet feeding table 39 is moved up and down and is urged against the conveying film 36, whereby the sheet on the conveying film 36 (when the film 36 is being wound by the roller 11) is scraped and collected onto the sheet feeding table 39.

Sensors are disposed at suitable locations on the sheet feeder 2. A sheet R detecting sensor (size detecting means) $A_2$ to be turned ON or OFF corresponding to the length and breadth of the sheet for detecting the length and breadth thereof placed on the sheet feeding table 39 is disposed on the right-hand portion of the sheet feeding table 39, and a sheet detecting sensor $A_1$ is disposed near the left-hand portion of the sheet feeding table 39. This sheet detecting sensor $A_1$ is turned ON or OFF corresponding to presence/absence of the sheet on the sheet feeding table 39 to detect the sheet thereon. Also disposed is a path switch sensor $A_4$ to be turned ON and OFF corresponding to movement of the sheet feeding table 39 to switch the sheet path, which sensor $A_4$ detects the sheet feeding table 39 is in counter-clockwisely rotated position in advance to allow only winding on the roller 11. Further, a sheet position detecting sensor $A_3$ is disposed between the right lower roller 11 and the lower feed roller 30. This sensor $A_3$ is comprised of a transmission type sensor, and is designed such that a light-intercepting frame mark 36a (which will be described later) attached to the conveying film 36 intercepts the optical path from the light projecting portion $A_{31}$ of the sensor $A_3$ to the light receiving portion $A_{32}$ to thereby detect the position of the sheet. The distance between the roller 30 and the sensor $A_3$ is predetermined, and distance between the roller 30 and the sensor $A_3$ is predetermined.

Figure 3:
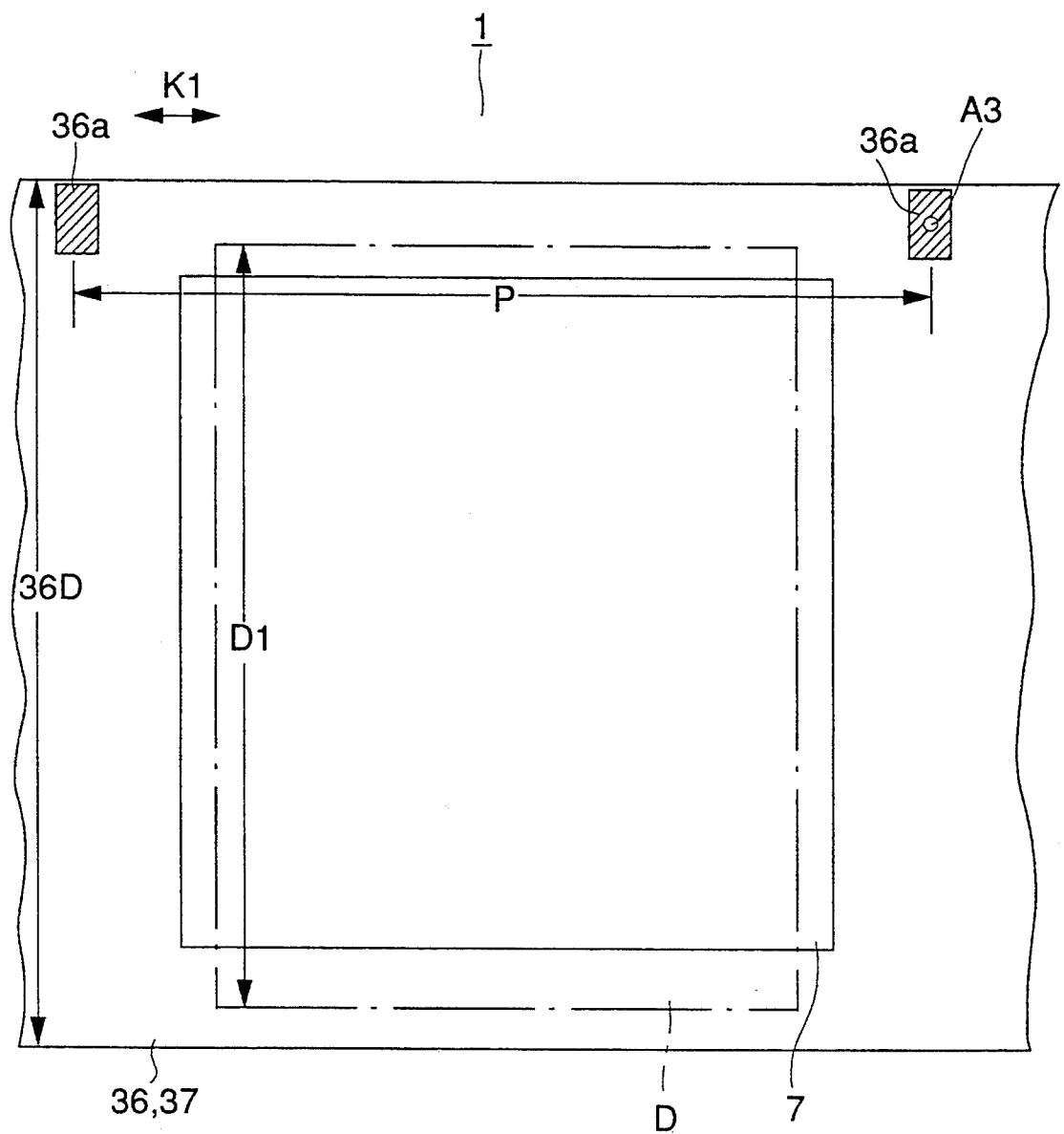
FIG. 3 is a top plan view showing the positional relation between platen glass and a sheet.

FIG. 3 is a plan view of the platen glass 7 of the OHP apparatus 1 as it is seen from above it. A sheet D (indicated by dots-and-dash line) sandwiched between the conveying film 36 and the keep film 37 is placed on the platen glass 7, and design is made such that the sheet D is irradiated from below it by the light source 9 below the platen glass 7 and an image is projected onto a screen (not shown) by the reflected light and transmitted light thereof. A number of frame marks 36a are disposed each for one frame (corresponding to one sheet) near one side edge of the conveying film 36, and the above-described sheet position detecting sensor $A_3$ detects one of these frame marks 36a, whereby the conveyance of the conveying film 36 and keep film 37 is immediately stopped to thereby stop and position the sheet D on a predetermined image area (substantially equal to the whole surface of the platen glass 7) on the platen glass 7. It is to be understood that the pitch P between adjacent frame marks 36a is set to such a degree that a laterally directed or vertically directed sheet D can be suitably disposed between the two adjacent frame marks.

Further, a remote control receiving portion 41 constituting a part of remote control means is disposed on the upper surface of the right-hand portion of the sheet feeder 2 (see FIG. 1). In the remote control transmitting portion 5 constituting the remote control means together with the remote control receiving portion 41, there are disposed, on a remote control light emitter 5a as light emitting means, a one sheet feed button $B_1$, a one sheet return button $B_2$, a fine feed button $B_3$, a fine return button $B_4$, a sheet discharge button $B_5$, a preset button $B_6$, a stop button $B_7$ and a laser pointer button $B_{12}$. The remote control transmitting portion 5 emits infrared ray (light) corresponding to a command and given by these buttons B, and operates control means 42 which will be described later, through the remote control receiving portion 41.

Figure 4:
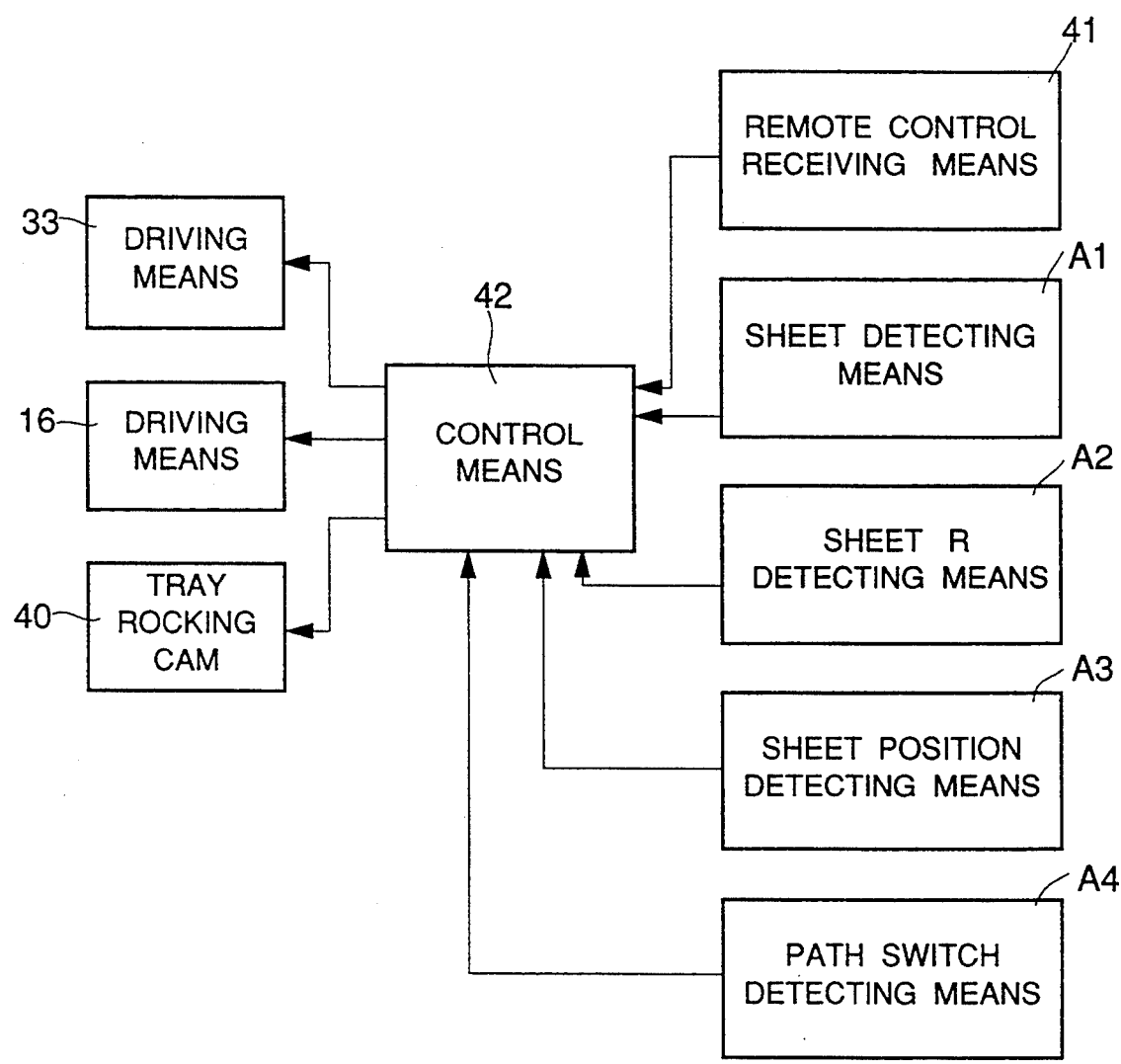
FIG. 4 is a block diagram showing the electrical construction of the sheet feeder.
Figure 5:
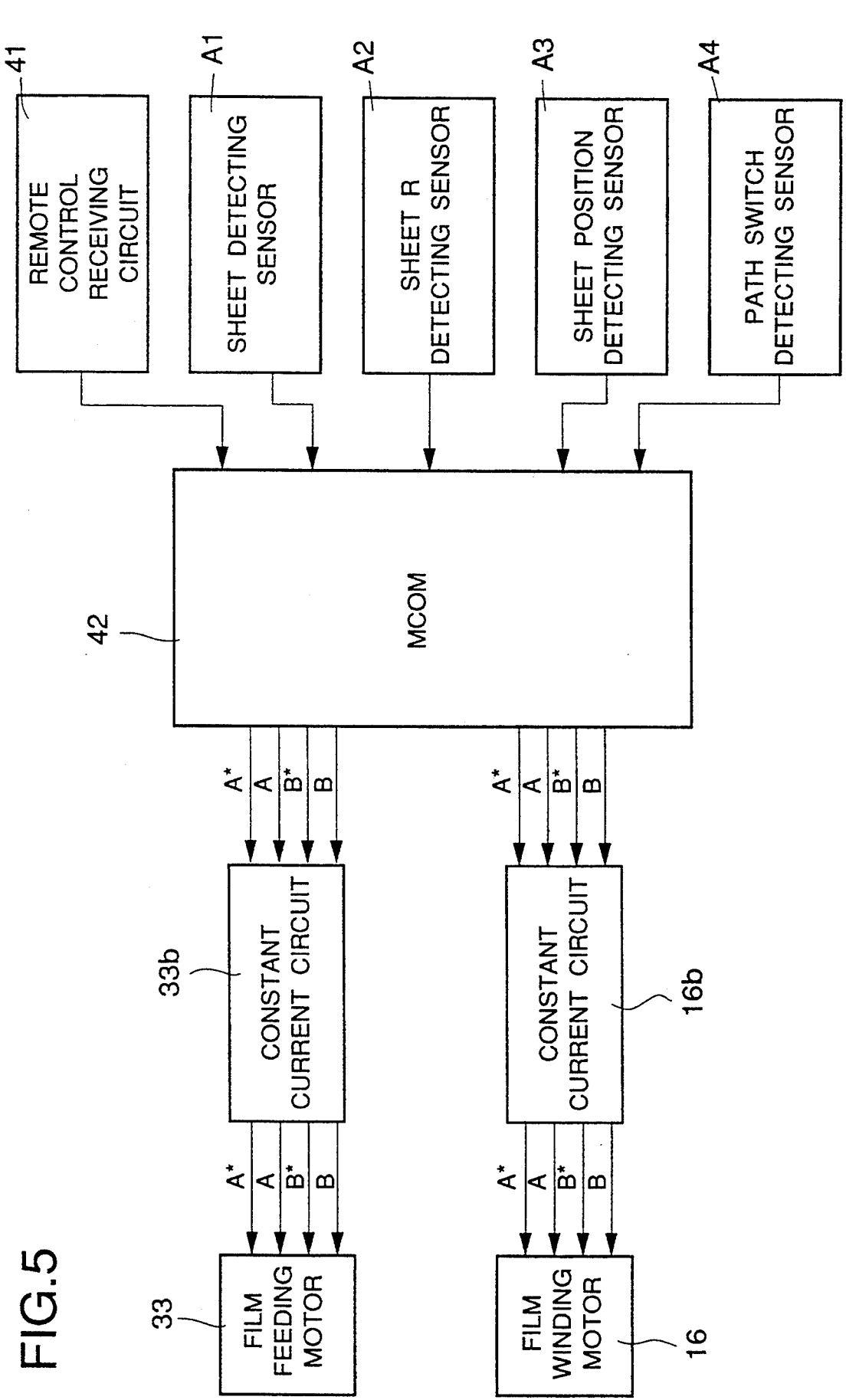
FIG. 5 is a hardware block diagram of the sheet feeder.

The epitome of the control of the sheet feeder 2 will now be described with reference to FIG. 4, and the substance of more specific control will be described with reference to a block diagram shown in FIG. 5. In FIGS. 4 and 5, functionally similar members are given similar reference characters, such as sheet detecting means $A_2$ and sheet detecting sensor $A_2$. That is, FIGS. 4 and 5 are in the relation between the higher rank concept (means) and the lower rank concept (specific member).

The control means 42 shown in FIG. 4 is for controlling the entire sheet feeder 2. The following means are connected to this control means 42; remote control receiving means 41 for remotely operating the sheet feeder 2, sheet detecting means $A_1$ for detecting that a sheet D to be held between the conveying film 36 and keep film 37 wound into the form of a roll has been set on the sheet feeding table 39, sheet R detecting means $A_2$ for detecting whether the sheet D is in a vertical position or in a lateral position, sheet position detecting means $A_3$ for detecting the arrival of a sheet D on the platen glass 7, path switch detecting means $A_4$ for selecting whether the sheet D held between the conveying film 36 and keep film 37 differing in thickness should be contained in the sheet feeder 2 or should be discharged out of the sheet feeder 2, and driving means 33 and 16 for conveying the conveying film 36 and keep film 37, respectively.

FIG. 5 shows the specific construction of each means shown in FIG. 4 with respect to the sheet feeder 2, and the control means is comprised chiefly of a well-known one-chip microcomputer (hereinafter referred to as "MCOM") 42 containing an ROM, an RAM, etc. therein. Various input members such as a remote control receiving circuit 41 for receiving a signal from the remote control receiving portion 5 which is remotely controllable, a sheet detecting sensor $A_1$ for detecting the sheet D, a sheet R detecting sensor $A_2$ for detecting whether the sheet D is a vertical original or a lateral original, a sheet position detecting sensor $A_3$ for detecting the position of the fed and conveyed sheet D and a path switch detecting sensor $A_4$ for detecting that the path of the sheet has been switched are connected as inputs to the MCOM 42. Further, design is made such that an output signal is transmitted from the MCOM 42 to a film feeding motor 33 through a constant current circuit 33b for driving the film feeding motor 33 and to a film winding motor 16 through a constant current circuit 16b for driving the film winding motor 16.

The film feeding motor 33 and film winding motor 16 are connected to the MCOM 42 via the constant current circuits 33b and 16b, respectively, and these connections are done by signal lines of four-phase signals, i.e., A*, A, B* and B, and the signal of the remote control receiving circuit 41 is transmitted as an ON/OFF signal to the film feeding motor 33 and film winding motor 16 via the constant current circuits 33b and 16b in accordance with the command of the MCOM 42. By the ON/OFF of the phase signal (A*→A →B*→B) being periodically changed, the film feeding motor 33 and film winding motor 16 can be rotated in a forward direction, and by giving a phase signal (B→B*→A→A*) opposite thereto, these motors 33 and 16 can be rotated in a reverse direction.

Figure 6A:
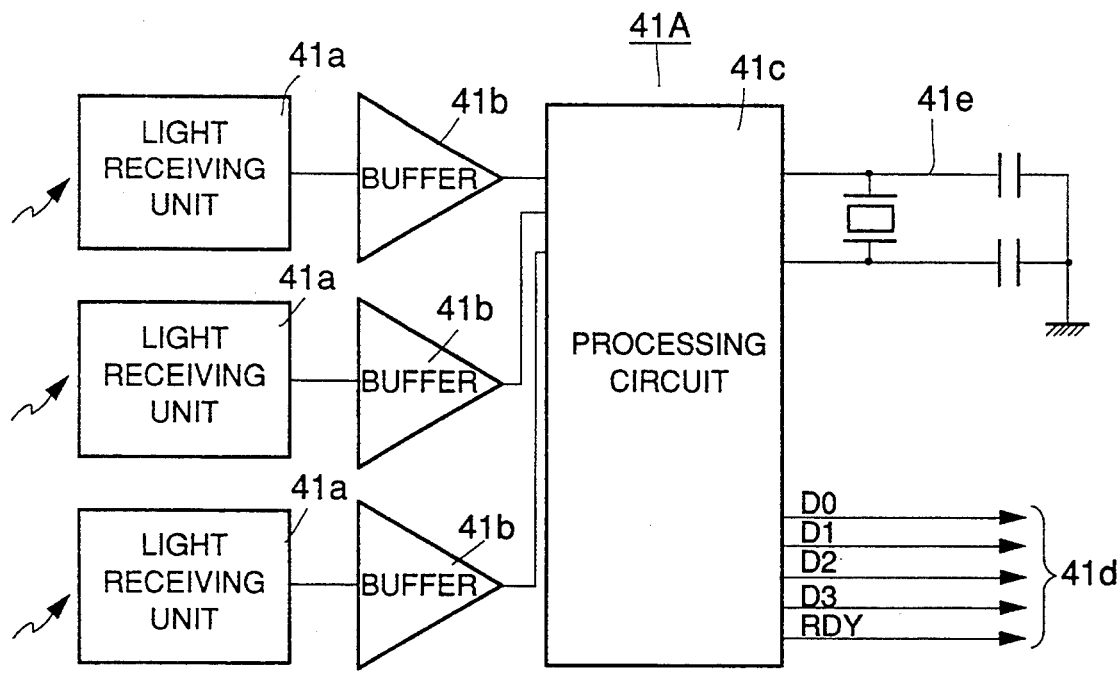
FIGS. 6A and 6B show the circuit construction of a remote control light receiving circuit.

FIG. 6A shows the circuit construction of the light receiving circuit 41A of the remote control receiving portion 41. The infrared ray signal from the remote control light emitter 5a (which will be described later in detail) of the remote control transmitting portion 5 is received by one or more light receiving units 41a and is converted into a serial electrical signal. This signal is input to a processing circuit 41c through a buffer 41b. In the processing circuit 41c, the signal is converted into parallel data corresponding to the input serial data, and the parallel data is output from an output port 41d.

Figure 6B:
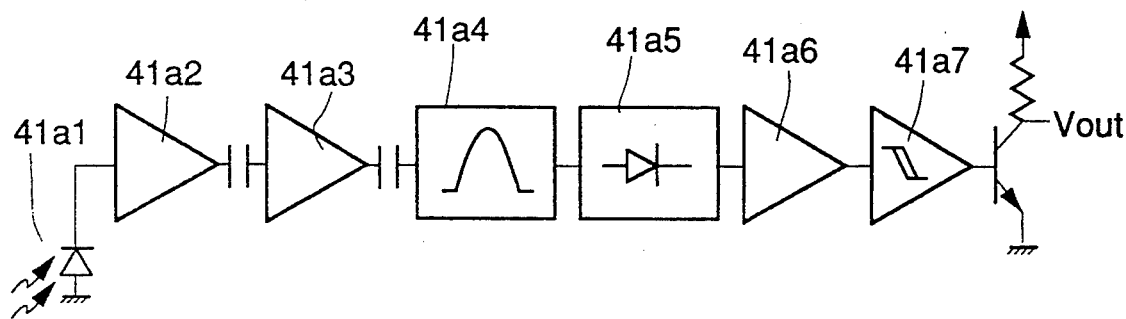

FIG. 6B shows the internal construction of the light receiving unit 41a in FIG. 6A. The infrared ray signal from the remote control light emitter 5a is converted into an electrical signal by a photodiode $41a_1$, and is amplified by an amplifier $41a_2$. This is then amplitude-limited by a limiter $41a_3$, and only a signal component of a particular frequency is taken out through a band-pass filter $41a_4$, whereafter it is demodulated by a demodulator $41a_5$. This is waveform-shaped by an integrator $41a_6$ and finally, by it being passed through a comparator $41a_7$, only signals of a certain level or higher are output.

Figure 7A:
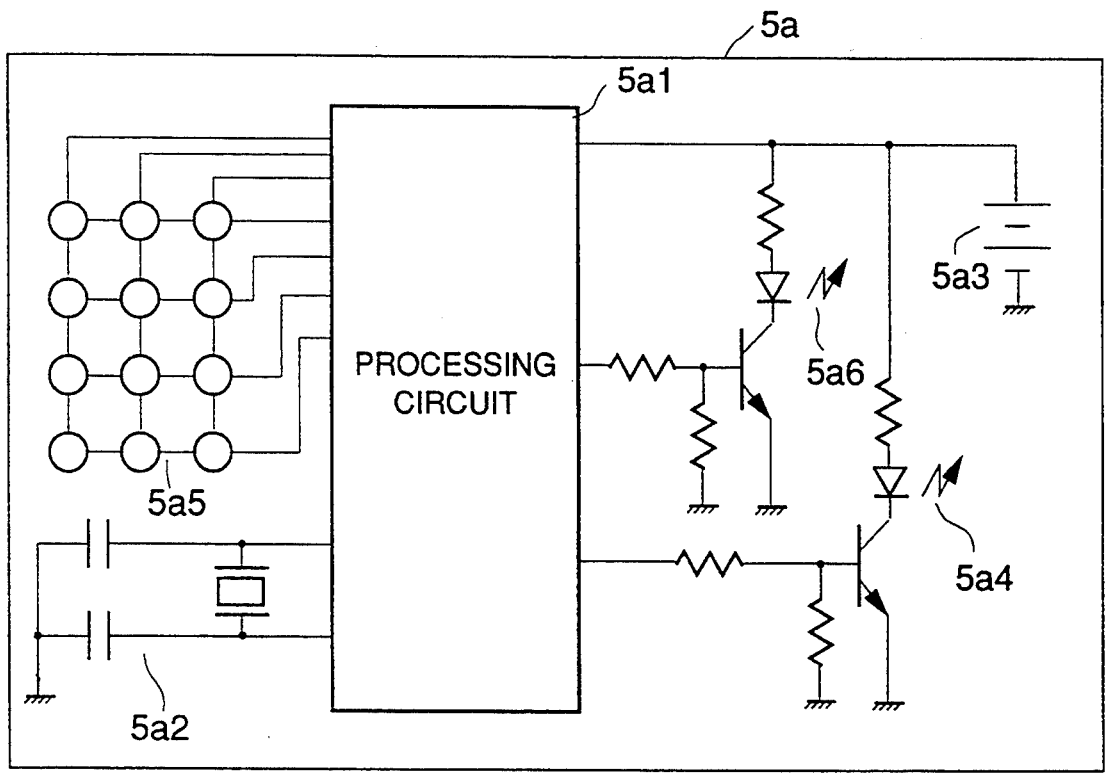
Figure 7B:
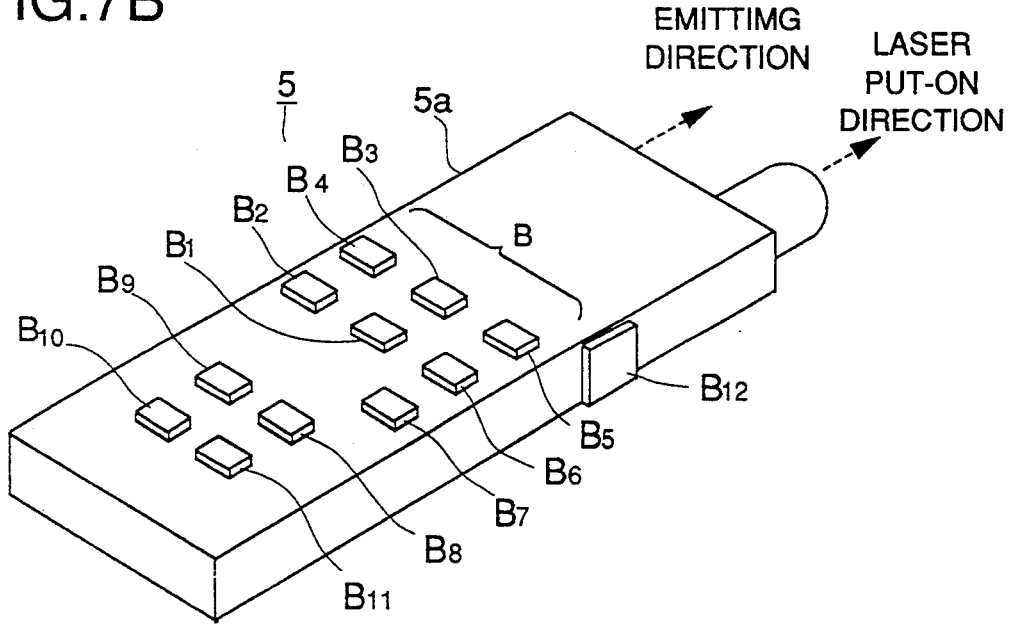

FIGS. 7A and 7B show the remote control transmitting portion 5 for transmitting signals to the above-described remote control receiving portion 41. The remote control light emitter 5a shown in FIG. 7B is one in which the more preferable functions of an illumination button $B_8$, etc. are added to the remote control light emitter 5a shown in FIG. 1, and FIG. 7A shows the internal construction of the remote control light emitter 5a. The remote control light emitter 5a has a plurality of keys (buttons) B, a keyboard PCB (not shown) and electrically conductive rubber (not shown) interposed between the keys B and the keyboard PCB. On the keyboard PCB, there are carried a conventional remote control transmitter unit provided with a processing circuit $5a_1$, a clock circuit $5a_2$ and a power source $5a_3$ and in addition, a laser transmission circuit $5a_4$. The remote control light emitter 5a is such that when a key B is depressed, the electrical conductive rubber is urged against the key matrix portion $5a_5$ of the keyboard PCB to thereby bring about electrical conduction and which one of the plurality of keys B has been depressed is judged in the processing circuit $5a_1$.

A code which will not overlap the other keys B is predetermined for each key B, and a code signal allotted to a depressed key B is output as serial data by the processing circuit $5a_1$, and this serial data is converted from an electrical signal into an infrared ray signal by an infrared light emitting circuit $5a_6$ and transmitted. One of the keys has not allotted thereto a code for remote control, and when the laser pointer button $B_{12}$ is depressed, a laser beam for the pointer (which points at the image on the screen) is put on by the laser transmission circuit $5a_4$. On this remote control light emitter 5a, there are disposed, besides a key for remotely controlling the operation of the sheet feeder 2, keys (buttons) for remotely controlling the OHP apparatus 1, for example, an illumination button $B_8$, a sound volume button $B_9$, an air condition button $B_{10}$, a lighting button $B_{11}$, etc.

FIG. 8A shows the transmission code construction, FIG. 8B shows the names of the keys B of the remote control light emitter 5a of FIG. 7 and transmission codes output when the keys B are depressed, and FIG. 8C shows reception data output from the light receiving circuit shown in FIGS. 6A and 6B and the functions thereof. The transmission signal is a serial signal and comprises a system code for effecting discrimination from other infrared ray remote control light emitter 5a, a data code which is a signal for performing the actual function, and an expansion code used when the function cannot be represented by the bit number of the data code. Data codes when the respective keys B are depressed are codes represented by 6 bits, and are such as shown in FIG. 8B. When the light receiving circuit 41A receives a signal output by each key B of the remote control light emitter 5a being depressed, the signal is converted into a parallel signal and is output from the processing circuit 41c. FIG. 8C shows the output reception data and the function of the sheet D for the reception data.

When the one sheet feed button $B_1$ is depressed, the sheet feeder 2 can feed a sheet D. When the one sheet return button $B_2$ is depressed, the sheet feeder can return a sheet D. The fine feed button $B_3$ is used when the position of the sheet D is to be moved to the feed side, and the sheet D is moved as long as this button is depressed. The fine return button $B_4$ is used when the position of the sheet D is to be moved to the return side, and the sheet D is moved as long as this button is depressed. When the sheet discharge button $B_5$ is depressed, the sheet D can be discharged, and when the preset button $B_6$ is depressed, the conveying film 36, etc. can be rewound up to the first sheet D. When the stop button $B_7$ is depressed, one sheet feed, sheet discharge and presetting can be interrupted. When the laser pointer button $B_{12}$ is depressed, the laser pointer can be caused to emit light as long as this button is depressed.

Description will now be made of the basic operation of the sheet feeder 2.

First, after the power source switch is closed, changeover is made to the sheet set path by a path changeover switch (not shown), and the preset button $B_6$ of the remote control transmitting portion 5 is depressed. Hereupon, the film preset command from the preset button $B_6$ of the remote control transmitting portion 5 is input to the MCOM 42, and a phase switching signal of a predetermined period is output to the constant current circuit 16$b$, which thus drives the film winding motor 16 by a constant current. If a film winding termination signal is detected by the sheet position detecting sensor $A_3$, the driving of the film winding motor 16 is stopped.

A sheet D is then set on the sheet feed table 39. In order to detect the sheet D at the sheet detecting sensor $A_1$, the phase signal of a predetermined period from the MCOM 42 is sent to the constant current circuit 33$b$ to thereby drive the film feeding motor 33, and the sheet D is sandwiched between the conveying film 36 and the keep film 37, and the sheet D is set with the three as a unit. More particularly, as soon as the sensor $A_1$ detects the sheet, the sensor $A_2$ detects the size of the sheet and the motor 33 is rotated, whereby the film begins to be wound by the roller 13. At this time, the mark is opposed to the location of the sensor $A_3$. Accordingly, in conformity with the size of the sheet, in a predetermined time after the start of the film feeding, the cam 40 is rotated counter-clockwise to thereby turn the sheet feed table 39 leftwardly, whereby the leading end of the sheet is nipped between the rollers 30 and 31 and the sheet is fed with the film. If the time when the cam 40 is rotated is changed depending on the size of the sheet, a sheet of any size will be positioned at the middle between adjacent marks, as shown in FIG. 3. In the present embodiment, the time when the cam should begin to be rotated is predetermined depending on whether the sheet is long from side to side or long from end to end.

When it is detected by the sheet position detecting sensor $A_3$ that a sheet D has been set, the driving of the film feeding motor 33 is stopped. Thereafter, an operation similar to that described above is repeated up to the last sheet D, and at a point of time whereat the last sheet D has been set, the preset button $B_6$ of the MCOM 42 is depressed once more, whereupon a film preset command is input from the remote control receiving circuit 41 to the MCOM 42, and a phase switching signal of a predetermined period is output to the constant current circuit 16$b$, which thus drives the film winding motor 16 by a constant current. When a film rewinding termination signal is detected by the sheet position detecting sensor $A_3$, the driving of the film winding motor 16 is stopped. Thus, the setting of the sheet D is terminated.

When the setting of the sheet D is terminated, the one sheet feed button $B_1$ of the remote control transmitting portion 5 is depressed, whereupon a one sheet feed command is input from the remote control receiving circuit 41 to the MCOM 42, and a sheet switching signal of a predetermined period is output to the constant current circuit 33$b$, which thus drives the film feeding motor 33 by a constant current. If it is detected by the sheet position detecting sensor $A_3$ that a sheet D has been fed, the driving of the film feeding motor 33 is stopped. Thus, the fed-out sheet D is set on the center of the platen glass 7 of the OHP apparatus 1 and the image on the sheet D is projected onto the screen. By this operation being repeated, the first to last sheets D are successively set on the platen glass 7 and the images thereon can be projected one after another.

The positional relation between the sheet D and the platen glass 7 at this time will now be described with reference to FIG. 3. In the sheet D, the width $D_1$ thereof in a direction perpendicular to the direction of movement thereof (arrow K1) is smaller than the width 36D of the conveying film 36 in the same direction. This is for preventing the sheet D from striking against the left roller front pulley 13$a$, the left roller rear pulley 13$b$, the right lower roller front pulley 11$a$ and the right lower roller rear pulley 11$b$ due to the deviation of the sheet D when the sheet D twines on the left roller 13 or the right lower roller 11. As regards the position of the sheet D relative to the image area, the frame marks 36$a$ are detected by the sheet position detecting sensor $A_3$ and are counted down by a predetermined amount, and the sheet D is stopped at such a position that the center of the sheet D coincides with the center of the image area. This is for coping with the problem that because the OHP apparatus 1 is enlarging the image information by the use of a lens, the circumference of the screen is dark and the image is not clearly projected.

When the one sheet return button $B_2$ of the remote control transmitting portion 5 is then depressed, one sheet return command is input from the remote control receiving circuit 41 to the MCOM 42 and a phase switching signal of a predetermined period is output to the constant current circuit 16$b$, which thus drives the film winding motor 16 by a constant current. If it is detected by the sheet position detecting sensor $A_3$ that a sheet D has been returned, the driving of the film winding motor 16 is stopped. Thereby, the sheet preceding the sheet D being projected can be again set on the platen glass 7 and be projected.

When it is desired to move the position of the set sheet D a little in the feed direction or the return direction, the fine feed button $B_3$ or the fine return button $B_4$ of the remote control transmitting portion 5 is depressed. By the operation of the fine feed button $B_3$, a fine feed command is input from the remote control receiving circuit 41 to the MCOM 42, and a phase switching signal of a predetermined period is output to the constant current circuit 33$b$, which thus drives the film feeding motor 33 by a constant current. Also, by the operation of the fine return button $B_4$, a fine return command is input from the remote control receiving circuit 41 to the MCOM 42, and a phase switching signal of a predetermined period is output to the constant current circuit 16$b$, which thus drives the film winding motor 16 by a constant current. Any of these commands conveys the conveying film 36, etc. only while the fine feed button $B_3$ or the fine return button $B_4$ is depressed, and the driving is stopped immediately after these buttons $B_3$ and $B_4$ are released.

The conveyance speed for one sheet feed or one sheet return and the conveyance speed for fine feed or fine return differ from each other, and the former speed is set to a higher speed than the latter speed. When it is desired to stop the conveyance of the sheet D during one sheet feed or during one sheet return, the stop button $B_7$ of the remote control transmitting portion 5 is depressed, whereupon a stop command is input from the remote control receiving circuit 41 to the MCOM 42, whereby the driving of the film feeding motor 33 or the film winding motor 16 is stopped.

Next, as regards the discharge of the sheet D out of the sheet feeder 2, the cam 40 is first rotated counter-clockwise to thereby turn the sheet feed table 39 leftwardly and set the path switch detecting sensor $A_4$ to the discharge side, and the sheet discharge button $B_5$ of the remote control transmitting portion 5 is depressed, whereupon a sheet discharge command is input from the remote control receiving circuit 41 to the MCOM 42, and a phase switching signal of a predetermined period is output to the constant current circuit 16b, which thus drives the film winding motor 16 by a constant current. Thereby, the fore end portion of the sheet feed table 39 is urged against the conveying film 36, thereby scraping up a number of sheets D on the conveying film 36 one by one and discharging them onto the sheet feed table 39. It is to be understood that the reading of the above-described input signal or the control of the ON/OFF of a load is executed in accordance with a program stored in the MCOM 42.

Description will now be made of a modification for setting the sheet between the adjacent marks of the film.

In this modification, as soon as the length and breadth information of the sheet is obtained from the sensor $A_2$, the film is wound onto the roller 13 by a predetermined amount from the state of FIG. 1. For example, where a lateral original is the standard mode, when the sheet is a lateral original, the film may remain in the state of FIG. 1, but when the sheet is a vertical original, the film is wound a little onto the roller 13 and the position of the mark is brought close to the roller 30 in advance. Thereby, any of the vertical original and the lateral original will be set on the center between the adjacent marks as shown in FIG. 3 even if the feeding of the sheet onto the film is started at the same timing after the sensor $A_1$ detects the sheet and the feeding of the film is started.

The inputting of the information of the vertical original or the lateral original may be manually selected by setting a size selecting button.

Second Embodiment

Description will now be made of an embodiment in which a mark sheet is attached to film, but the timing for feeding the sheet from the sheet feed table 39 and sandwiching the sheet between the conveying film and the keep film is the same for a vertical original and a lateral original.

In the case of this embodiment, when for example, a lateral original is set as the standard mode, a lateral original will be set on the center between adjacent marks, but a vertical original will be set at a slightly deviated position.

So, to feed film in which vertical and lateral originals are mixedly present and position a sheet on the center of the platen, the following flow is adopted.

Figure 9:
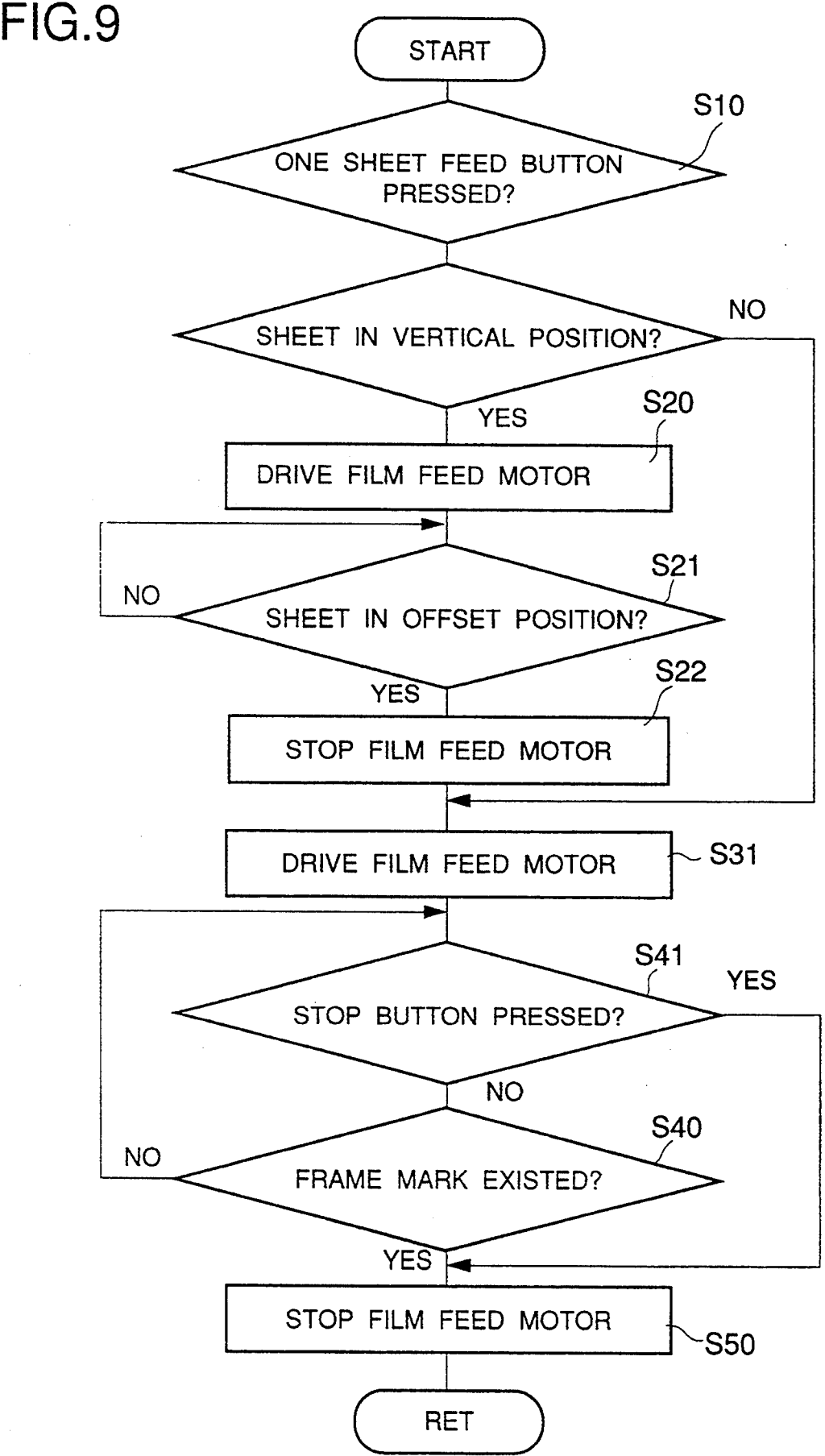
FIG. 9 is a flow chart of a second embodiment.

FIG. 9 shows a flow chart of the present embodiment. When the one sheet feed button is depressed, whether the sheet D is a vertical original or a lateral original is judged from a memory value read by the sheet R detecting sensor $A_2$ (S10), and if the sheet D is a vertical original, the film feeding motor 33 is driven (S20) to thereby move the conveying film 36 and the keep film 37, and when the sheet D is conveyed by a predetermined amount from the frame mark (S21), the film feeding motor 33 is stopped (S22) and the sheet is set on the center of the platen glass.

If the sheet D is a lateral original, advance is made to a step S31. Subsequently, the film feeding motor 33 is actuated to thereby convey the sheet D as it is sandwiched between the conveying film 36 and the keep film 37. Subsequently, at steps S40 and S41, whether the frame mark 36a indicative of a frame corresponding to a sheet has been detected (S40) or whether the stop button $B_7$ of the remote control light emitter 5a has been depressed (S41) is judged, and the steps S31, S40 and S41 are repeated until the frame mark 36a is detected or the stop button $B_7$ of the remote control light emitter 5a is depressed, and if the frame mark 36a (S40) or the depression of the stop button $B_7$ of the remote control light emitter 5a (S41) is detected, advance is made to a step S50, where the driving of the film feeding motor 33 is stopped to thereby stop the movement of the conveying film 36 and keep the film 37 and the sheet D sandwiched therebetween.

By the above-described operation being repeated, the conveying film 36 and the keep film 37 and the sheet D sandwiched therebetween can be fed to the left roller 13 so that the sheet may be placed on the center of the platen glass 7 of the OHP apparatus 1.

In the present embodiment, the length and breadth information of sheets to be set between the conveying film and the keep film is memorized in the order of the setting of the sheets.

Third Embodiment

Description will now be made of an embodiment in which no mark is used and the sheet is sandwiched between the conveying film and the keep film.

In the case of this embodiment, when the sensor $A_1$ detects the sheet, the cam 40 is rotated counter-clockwise to thereby turn the sheet feed table 39 leftwardly and feed the sheet as it is sandwiched between the conveying film and the keep film. Since whether the sheet is a vertical original or a lateral original has already been detected by the sensor $A_2$, the film is fed by a predetermined distance after the sheet is sandwiched between the conveying film and the keep film, and the sheet is stopped at the center of the platen. How much the sheet should be fed in conformity with its vertical or lateral position until it comes to the center of the platen is predetermined. Subsequently, the next sheet is fed in a similar manner and is stopped at the center of the platen in a similar manner. Thereafter, a similar operation is performed to thereby sandwich a plurality of sheets between the conveying film and the keep film.

To feed the film in which vertical and lateral originals are mixedly present and position the sheets on the center of the platen in this manner, the following flow is adopted.

Figure 10:
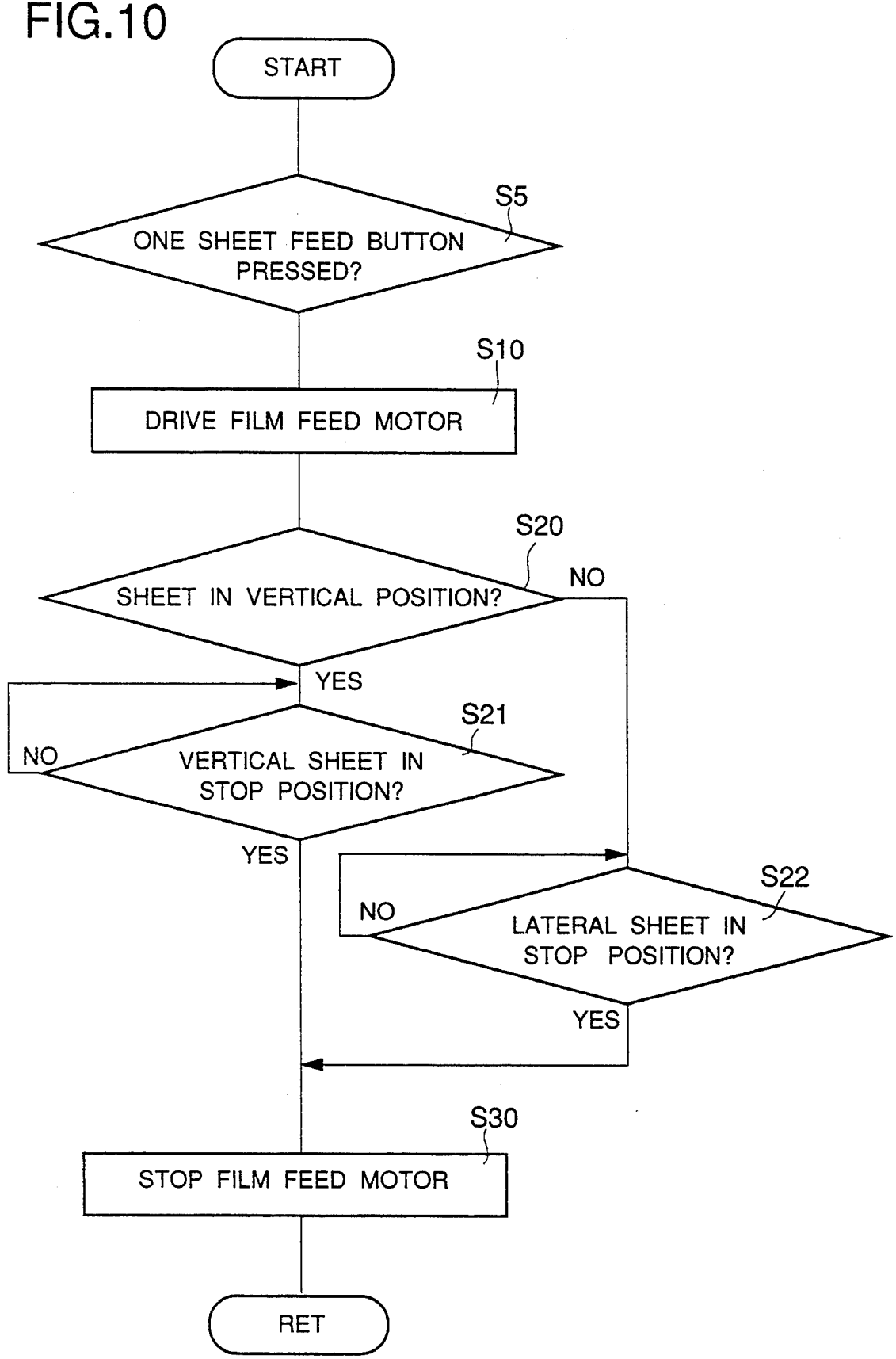
FIG. 10 is a flow chart of a third embodiment.

FIG. 10 shows a flow chart of the present embodiment. When the one sheet feed button is depressed (S5), the film feeding motor 33 is driven (S10). Advance is then made to a step S20, where whether the set sheet D is a vertical original or a lateral original is judged from a memory value read by the sheet R detecting sensor $A_2$ (S20), and if the sheet D is a lateral original, advance is made to a step S22. If the sheet D is a vertical original, advance is made to a step S21. Subsequently, at steps S21 and S22, the amount of movement of the sheet is measured, and when the amount of conveyance until the sheet is placed on the center of the platen glass 7 of the OHP apparatus 1 is judged, the film feeding motor 33 is stopped (S30). By the above-described operation being repeated, the conveying film 36 and the keep film 37 and the sheet D carried therebetween can be fed to the left roller 13 so that the sheet may be placed on the center of the platen glass 7 of the OHP apparatus.

Again in the present embodiment, the length and breadth information of sheets set between the conveying film and the keep film is memorized in the order of the setting of the sheets.

In the above-described third embodiment, a mechanical sensor for detecting the leading end of the sheet may be disposed near the roller 30 and the sheet may be fed by a predetermined distance from this leading end detecting position. Again thereby, lateral originals and vertical originals are mixedly present at predetermined intervals and are sandwiched and set between the conveying film and the keep film. Accordingly, if after the setting, the film is wound and fed at said predetermined intervals, the sheets each can be positioned on the center of the platen.

Description will now be made of a method of controlling illumination, sound volume, air conditioning and room custody in remote control means which produces a signal for controlling the sheet feeder 2 and an environment controlling apparatus.

Figure 11:
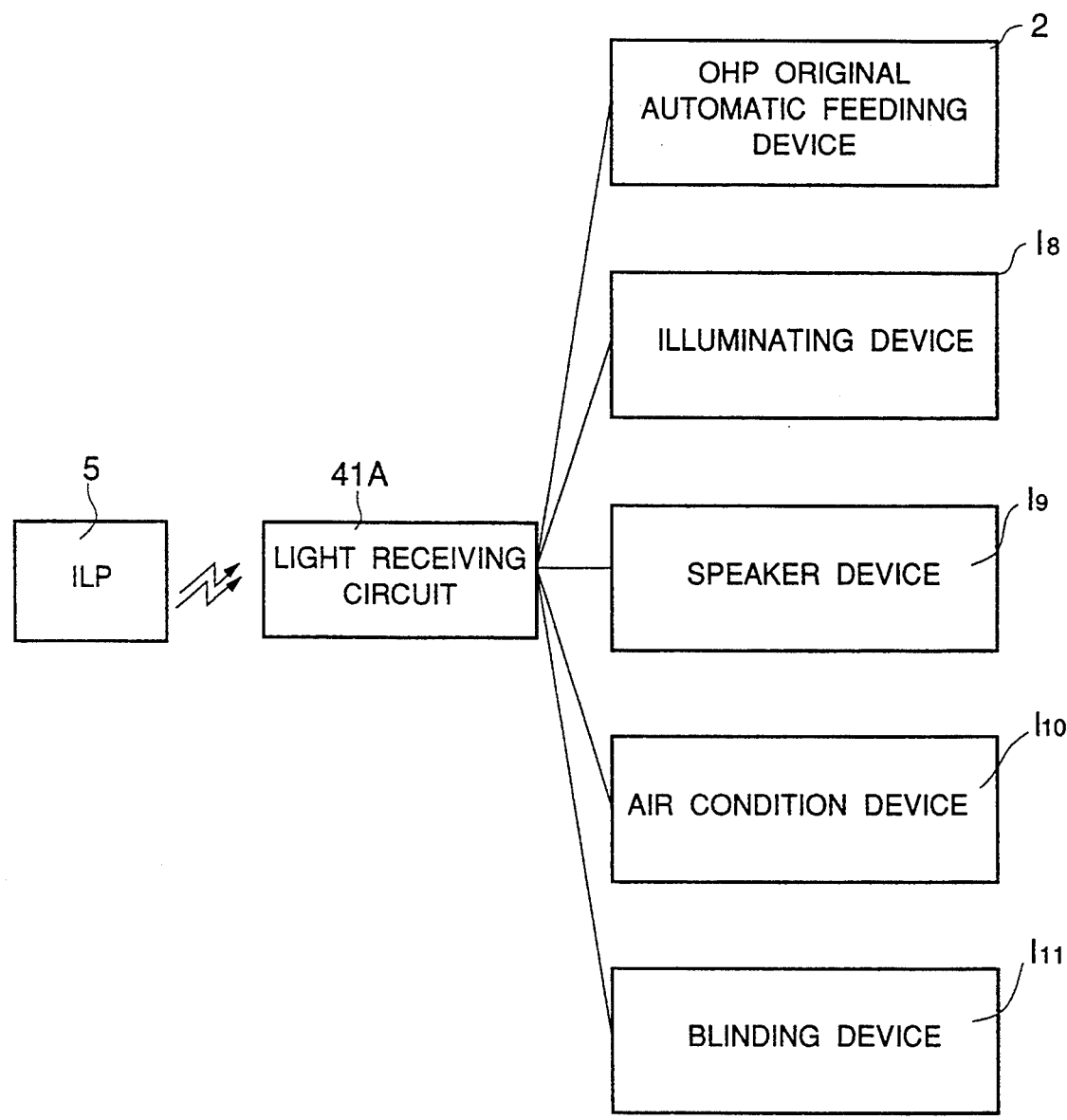
FIG. 11 shows the general construction of an overhead projector.

FIG. 11 is a schematic diagram of a system using the present invention.

The reference numeral 5 designates an intelligent laser pointer (hereinafter referred to as "ILP"). The reference character 41A denotes the light receiving circuit shown in FIGS. 6A and 6B, and the reference numeral 2 designates a sheet feeder (an automatic original feeding device). The reference character $I_8$ denotes an illuminating device capable of identifying reception data output from the light receiving circuit 41A, and turning ON or OFF illumination if the reception data is a pre-allotted code, the reference character $I_9$ designates a speaker device capable of switching ON or OFF the power source of a speaker, the reference character $I_{10}$ denotes an air conditioner device capable of switching ON or OFF the power source of the air conditioner, and the reference character $I_{11}$ designates a blinding device capable of identifying reception data, and driving a motor if the reception data is a pre-allotted code, and opening and closing a blind by this motor. These devices $I_8$–$I_{11}$ correspond to the buttons $B_8$–$B_{11}$, respectively, of the intelligent laser pointer 5 shown in FIG. 7, and are designed to be operated by these buttons being depressed.

A transmitted signal from the ILP 5 is converted into a parallel electrical signal by the light receiving circuit 41A, which outputs the parallel electrical signal. Such codes that will not overlap one another as shown in FIG. 8C are pre-allotted to the respective devices. The reception data output from the light receiving circuit 41A are sent to the respective devices. The respective devices discriminate the codes of the data sent thereto. If the code discriminated coincides with the allotted code, the illuminating device $I_8$ turns off equipment such as fluorescent lamps and the power source of the light source 9 of the OHP apparatus 1 if they are now ON, and turns them on if they are now OFF. If the code discriminated coincides with the allotted code, the speaker device $I_9$ puts off a power source for operating the speaker if it is now ON, and puts on the power source if it is now OFF. If the code discriminated coincides with the allotted code, the air conditioner device $I_{10}$ puts off a power source for operating the air conditioner if it is now ON, and puts on the power source if it is now OFF. If the code discriminated coincides with the allotted code, the blinding device $I_{11}$ can drive a motor in such a direction as to intercept the sunlight to thereby intercept the sunlight if the blind is now in a state for permitting the entry of the sunlight, and can drive the motor in the opposite direction to thereby permit the entry of the sunlight if the blind is now in a state for intercepting the sunlight.

That is, illumination remote control means, $A_V$ remote control means, air condition remote control means and room remote control means (all not shown) for controlling the illuminating device $I_8$, the speaker device $I_9$, the air conditioner device $I_{10}$ and the blinding device $I_{11}$, respectively, are contained in the light receiving circuit 41A.

Alternatively, a plurality of light receiving circuits 41A may be installed and each of the light receiving circuits may be provided with the illuminating device $I_8$, the speaker device $I_9$, the air conditioner device $I_{10}$ and the blinding device $I_{11}$.

The basic operation of an embodiment in which driving means for moving the conveying film 36 carrying the sheet D thereon in the above-described first embodiment is controlled in conformity with the frame marks 36a attached to the conveying film 36 will now be described with reference to a flow.

Figure 12:
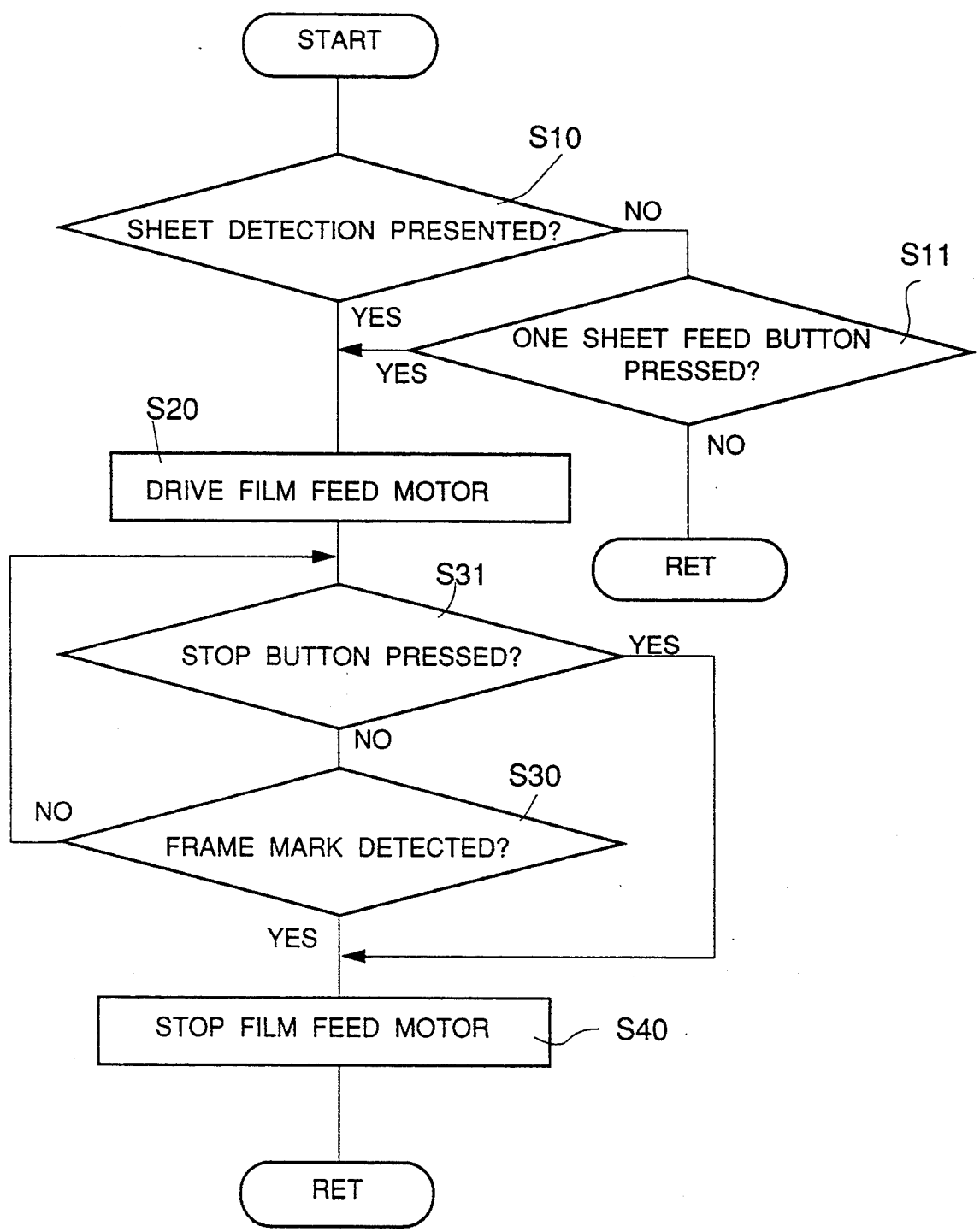
FIG. 12 is a flow chart showing the basic operation of a first embodiment.

FIG. 12 shows a flow chart of the present embodiment. Whether a sheet D is detected by the sheet detecting sensor $A_1$ (S10) or whether the one sheet feed button $B_1$ is depressed in the remote control light emitter 5a is judged (S11), and if the sheet D is detected or the one sheet feed button $B_1$ is depressed, advance is made to a step S20, where the film feeding motor 33 is driven to thereby sandwich the sheet D between the conveying film 36 and the keep film 37 and move the sheet on the platen glass 7. Subsequently, at steps S30 and S31, whether a frame mark 36a indicative of a sheet D has been detected (S30), or whether the stop button $B_7$ of the remote control light emitter 5a has been depressed (S31) is judged, and the step S20 is repeated until the frame mark 36a is detected or the stop button $B_7$ of the remote control light emitter 5a is depressed, and if the frame mark 36a (S30) or the depression of the stop button $B_7$ of the remote control light emitter 5a (S31) is detected, advance is made to a step S40, where the driving of the film feeding motor 33 is stopped to thereby stop the movement of the conveying film 36 and the keep film 37 and the sheet D sandwiched therebetween. By the above-described operation being repeated, the conveying film 36 and the keep film 37 or the sheet D sandwiched therebetween can be fed to the left roller 13 of the sheet feeder 2.

An end mark will now be described in detail.

The film feeding motor 33 is controlled by the frame mark 36a being detected, but it is intended to control driving means for measuring the length of this frame mark 36a to thereby detect the end of the conveying film 36 and drive this film.

Figure 13:
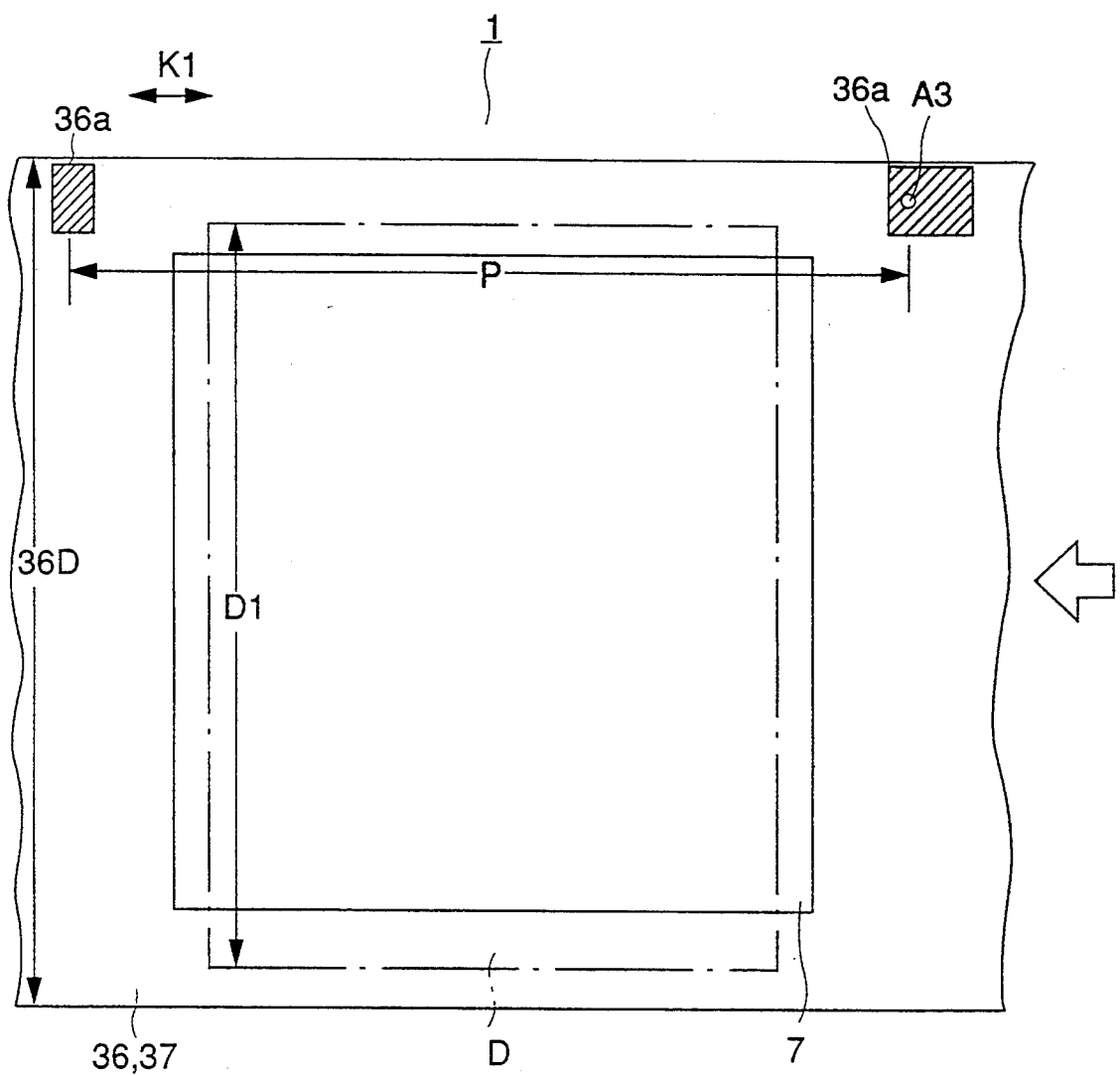
FIG. 13 shows an end frame mark.

FIG. 13 shows an embodiment in which a frame mark 36a is used as an end mark, the length of which is greater than that of the ordinary frame marks 36a (in FIG. 13, for example, the right frame mark 36a is made longer in the direction of conveyance (the direction of arrow K1) than the left frame mark 36a and this mark is discriminated by the sheet position detecting sensor $A_3$). Accordingly, in this case, the sheet position detecting sensor $A_3$ acts as film end discriminating means.

Figure 14:
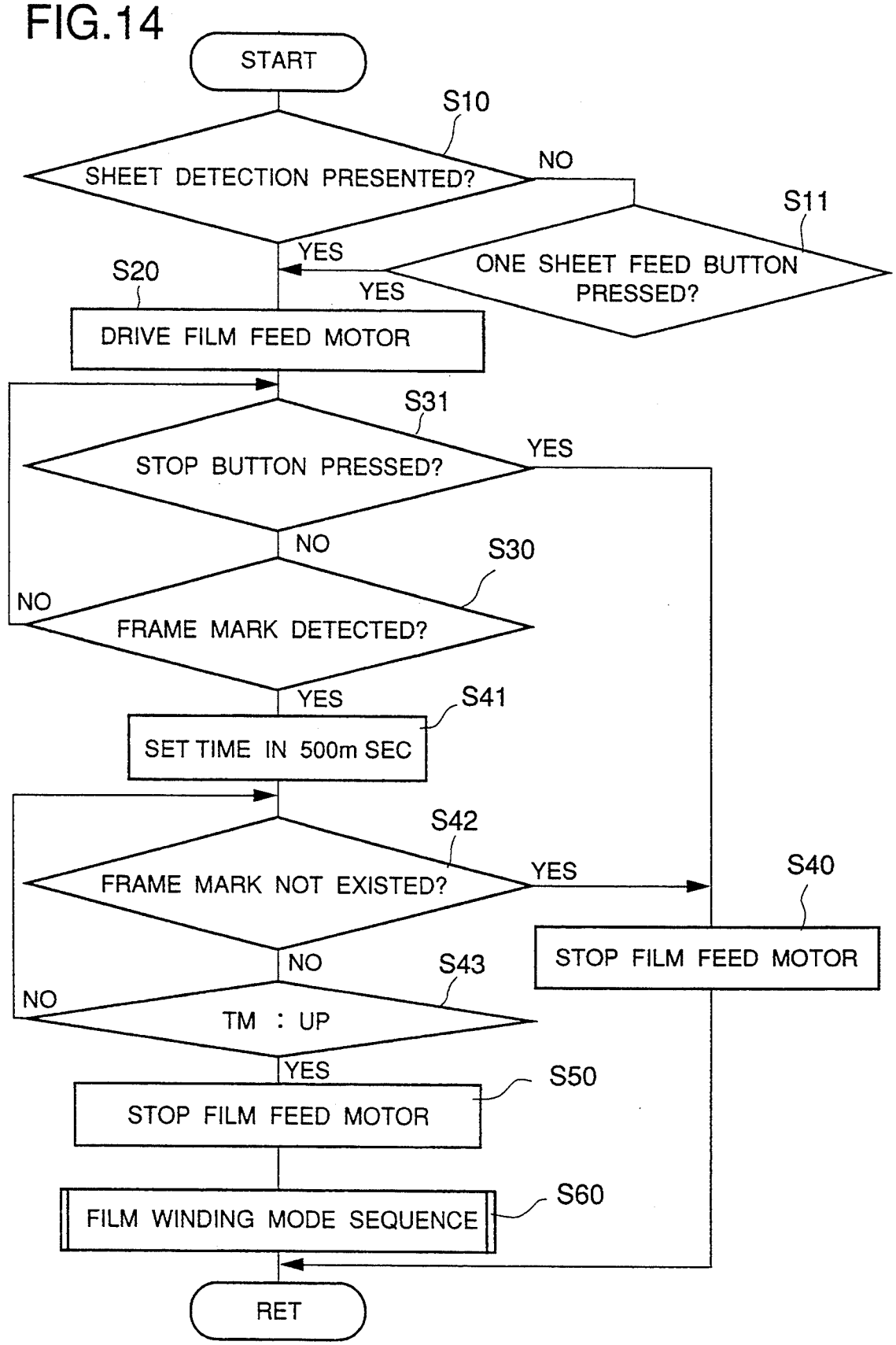
FIG. 14 is a flow chart illustrating the action of the end frame mark.

FIG. 14 shows a flow chart of the present embodiment. Whether a sheet D is detected by the sheet detecting sensor $A_1$ (S10) (when the sheet is initially set) or whether the one sheet feed button $B_1$ of the remote control light emitter 5a is depressed (after the completion of the setting) is judged (S11), and if the sheet D is detected or the one sheet feed button B₁ is depressed, advance is made to a step S20, where the film feeding motor 33 is driven to thereby sandwich the sheet D between the conveying film 36 and the keep film 37 and move the sheet D on the platen glass 7. Subsequently, if at steps S30 and S31, the frame mark 36a indicative of a frame corresponding to a sheet is detected (S30), advance is made to a step S41, where the timer is set to 500 msec. If here, the frame mark 36a is continuedly detected (S42), time up (the length of the end frame mark 36a corresponds to 20 mm) is waited for (S43). If in the meantime, the frame mark 36a of the sheet D is no longer detected, advance is made to a step S40, and since a predetermined amount of feed has been terminated, the flow terminates as in the previous embodiment, but if the frame mark 36a remains detected (step S42) even when 500 msec. has passed, this is the long end frame mark and therefore, this is regarded as the end of the conveying film 36 and the film feeding motor 33 is stopped (S50), and the flow enters a sequence which inhibits the driving of the film feeding motor 33 thereafter and permits the driving only in the winding direction.

In the previous embodiment, the length of the frame mark 36a is detected to thereby control the film feeding motor 33, but an embodiment which will hereinafter be described intends to detect the division of this frame mark 36a to thereby control the driving means for driving the conveying film 36.

Figure 15:
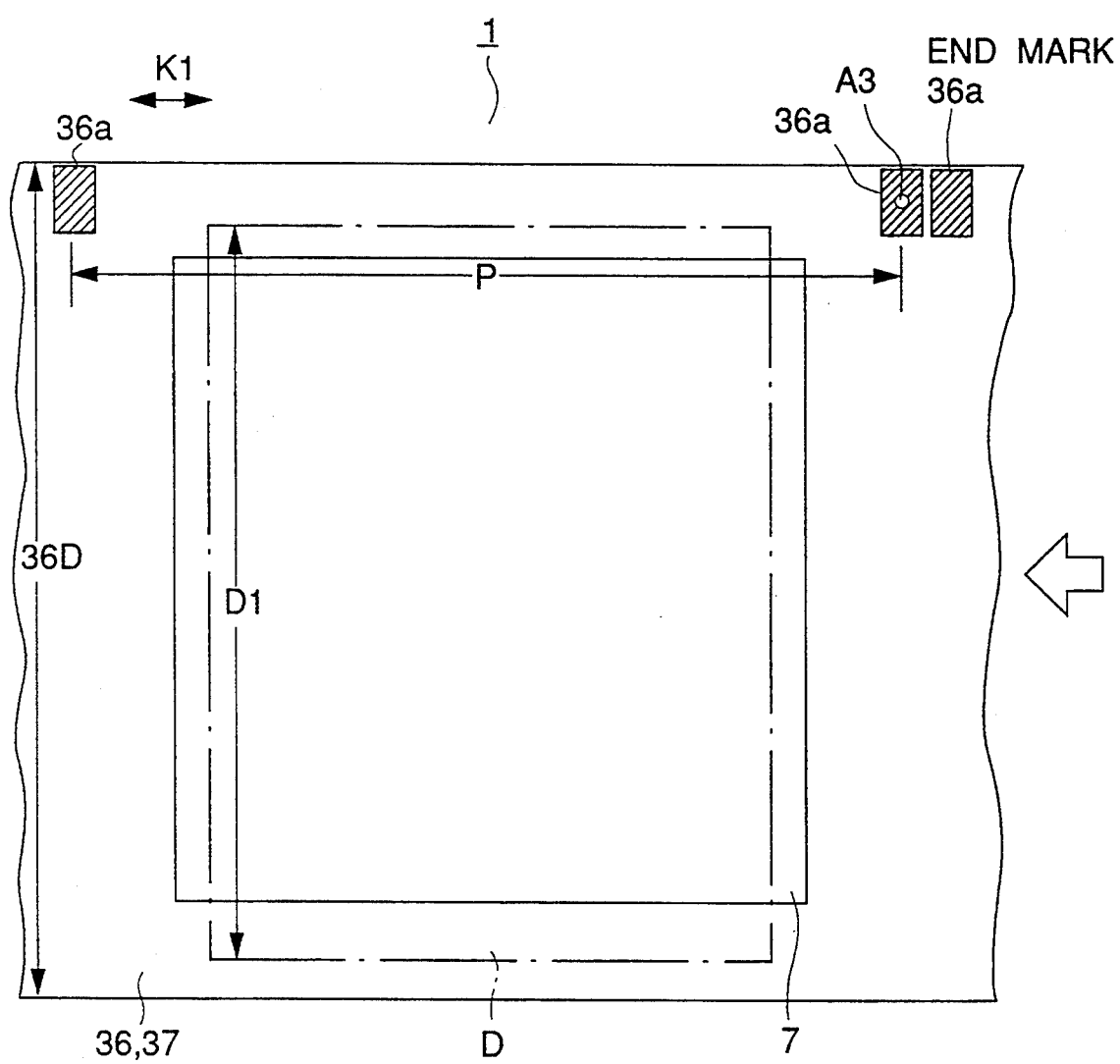
FIG. 15 shows another example of the end frame mark.

FIG. 15 shows a frame mark 36a according to the present embodiment. The ordinary frame mark 36a comprises one mark, but two such frame marks 36a are provided closely adjacent to each other, and by these frame marks 36a being detected, the driving means for driving the conveying film 36 is controlled.

FIG. 16 shows a flow chart of the present embodiment. .Whether a sheet D is detected by the sheet detecting sensor A₁ (S10) or whether the one sheet feed button B₁ of the remote control light emitter 5a is depressed is judged (S11), and if the sheet D is detected or the one sheet feed button B₁ is depressed, advance is made to a step S20, where the film feeding motor 33 is driven to thereby sandwich the sheet D between the conveying film 36 and the keep film 37 and move the sheet D on the platen glass 7. Subsequently, at steps S30 and S31, the frame mark 36a indicative of a frame corresponding to a sheet is detected (S30), and when this frame mark 36a (S30) is detected, advance is made to a step S41, where the measurement of the frame mark 36a of the conveying film 36 is entered. However, if it is judged that the one sheet feed button B₁ of the remote control light emitter 5a has been depressed (S31), advance is made to a step S40, where the film feeding motor 33 is stopped. At a step S41, the timer is set to 500 msec. and time up (the length of the frame mark 36a corresponds to 20 mm) is waited for (S43).

If in the meantime, the frame mark 36a of the sheet D is no longer detected (S42), advance is made to a step S44, where the timer is further set to 500 msec., and whether the next frame mark 36a should be detected is judged (S45). If in the meantime, the frame mark 36a is detected (S45), this is regarded as the end of the conveying film 36 and the film feeding motor 33 is stopped (S50), and the flow enters a sequence which inhibits the driving of the conveying film 36 thereafter and permits driving only in the winding direction (S60). However, if steps S45 and S46 are repeated and time is up, it is not the end of the conveying film 36 and therefore, advance is made to a step S40, where the flow terminates.

What is claimed is:

1. A projection original film feeding apparatus, comprising:
   feeding means for feeding an original film to a projecting position;
   size means for outputting size information of the original film; and
   control means for varying a feeding amount of the original film by said feeding means to conform with the size information from said size means and setting the original film in a substantially central portion of the projecting position in a sheet feeding direction for each size irrespective of the size of the original film.

2. A projection original film feeding apparatus according to claim 1, wherein said feeding means is a belt-like member for conveying the original film, said belt-like member having marks formed at predetermined intervals in the direction of feeding, and further comprising a detecting sensor for detecting the marks on the original film to determine the amount of feed of the original film.

3. A projection original film feeding apparatus, comprising:
   feeding means for feeding an original film to a projecting position;
   size means for outputting size information of the original film; and
   control means for varying a feeding amount of the original film by said feeding means to conform with the size information from said size means and setting the original film in a regular projecting position for each size irrespective of the size of the original film,
   wherein said size means is a size detecting sensor disposed in an original film supply port to said feeding means.

4. A projection original film feeding apparatus, comprising:
   feeding means for feeding an original film to a projecting position;
   size means for outputting size information of the original film; and
   control means for varying a feeding amount of the original film by said feeding means to conform with the size information from said size means and setting the original film in a regular projecting position for each size irrespective of the size of the original film,
   wherein said size means is manual setting means capable of selecting the size of the original film.

5. A projection original film feeding apparatus, comprising:
   feeding means for feeding an original film to a projecting position, said feeding means having a belt-like member for conveying the original film and said belt-like member having marks formed at predetermined intervals in a feeding direction, the marks being detected to determine the feeding amount of the original film;
   size means for outputting the size information of the original film;
   supply means for supplying the original film to said moving belt-like member; and control means for varying an operation timing of said supply means to conform with the size information from said size means, wherein the original film is set at a proper location with respect to the marks for each size irrespective of the size of the original film.

6. A projection original film feeding apparatus, comprising:

feeding means for feeding an original film to a projecting position, said feeding means having a belt-like member for conveying the original film, said belt-like member having marks formed at predetermined intervals in a feeding direction, and the marks being detected to determine the feeding amount of the original film;

size means for outputting size information of the original film;

control means for moving said belt-like member in advance by a predetermined amount to conform with the size information from said size means; and supply means for supplying the original film to said belt-like member controlled by said control means, wherein the original film is set at a proper location with respect to the marks for each size irrespective of the size of the original film.

7. A projection original film feeding apparatus according to claim 5 or 6, wherein the proper location is a central location between adjacent marks.

8. A projection original film feeding apparatus, comprising:

feeding means for feeding an original film to a projecting position, said feeding means being a belt-like member for conveying the original film, said belt-like member having marks formed at predetermined intervals in a feeding direction and the marks being detected to determine the feeding amount of the original film;

size means for outputting size information of the original film;

supply means for supplying the original film to said belt-like member at predetermined timing independent from the size of the original film; and control means for correcting mark detection information conforming with the size information from said size means and varying a moving amount of said belt-like member, wherein the original film is set at a regular projecting position for each size irrespective of the size of the original film.

9. A projection original film feeding apparatus, comprising:

feeding means for feeding an original film to a projecting position, said feeding means being a belt-like member for conveying the original film, said belt-like member having marks formed at predetermined intervals in a feeding direction and the marks being detected to determine a feeding amount of the original film;

size means for outputting size information of the original film;

detecting means for detecting a leading end of the original film; and control means for varying a feeding amount of the original film by said feeding means after detection of the leading end by said detecting means conforming with the size information from said size means, wherein the original film is set in a regular projecting position for each size irrespective of the size of the original film.

10. A projection original film feeding apparatus according to claim 8 or 9, wherein the regular position is the central position of the projecting position.

11. An overhead projector, comprising:

feeding means for feeding original film to a projecting position;

size means for outputting size information of the original film;

control means for varying a feeding amount of the original film by said feeding means to conform with the size information from said size means and setting the original film in a substantially central portion of the projecting position in a sheet feeding direction for each size irrespective of the size of the original film; and means for applying light to the original film set at the projecting position.

12. An overhead projector, comprising:

feeding means for feeding an original film to a projecting position;

size means for outputting size information of the original film; and control means for varying a feeding amount of the original film by said feeding means to conform with the size information from said size means and setting the original film in a regular projecting position for each size irrespective of the size of the original film, wherein said size means is a size detecting sensor disposed in an original film supply port to said feeding means.

13. An overhead projector, comprising:

feeding means for feeding an original film to a projecting position;

size means for outputting size information of the original film; and control means for varying a feeding amount of the original film by said feeding means to conform with the size information from said size means and setting the original film in a regular projecting position for each size irrespective of the size of the original film, wherein said size means is manual setting means capable of selecting the size of the original film.

14. An overhead projector according to claim 11, wherein said feeding means is a belt-like member for conveying the original film, said belt-like member having marks formed at predetermined intervals in the direction of feeding, and further comprising a detecting sensor for detecting the marks to determine the amount of feed of the original film.

15. An overhead projector, comprising:

feeding means for feeding an original film to a projecting position, said feeding means including a belt-like member for conveying the original film and said belt-like member having marks formed at predetermined intervals in a feeding direction, the marks being detected to determine the feeding amount of the original film;

size means for outputting size information of the original film;

supply means for supplying the original film to said moving belt-like member; and control means for varying an operation timing of said supply means to conform with the size information from said size means, wherein the original film is set at a proper location with respect to the marks for each size irrespective of the size of the original film.

16. An overhead projector, comprising:

feeding means for feeding an original film to a projecting position, said feeding means including a belt-like member for conveying the original film, said belt-like member having marks formed at predetermined intervals in a feeding direction, and the marks being detected to determine the feeding amount of the original film;

size means for outputting size information of the original film;

control means for moving said belt-like member in advance by a predetermined amount to conform with the size information from said size means; and supply means for supplying the original film to said belt-like member controlled by said control means, wherein the original film is set at a proper location with respect to the marks for each size irrespective of the size of the original film.

17. An overhead projector, comprising:

feeding means for feeding an original film to a projecting position, said feeding means being a belt-like member for conveying the original film, said belt-like member having marks formed at predetermined intervals in a feeding direction and the marks being detected to determine the feeding amount of the original film;

size means for outputting size information of the original film;

supply means for supplying the original film to said belt-like member at predetermined timing independent from the size of the original film; and control means for correcting mark detection information to conform with the size information from said size means and varying a moving amount of said belt-like member, wherein the original film is set at a regular projecting position for each size irrespective of the size of the original film.

18. An overhead projector, comprising:

feeding means for feeding an original film to a projecting position, said feeding means being a belt-like member for conveying the original film, said belt-like member having marks formed at predetermined intervals in a feeding direction and the marks being detected to determine a feeding amount of the original film;

size means for outputting size information of the original film;

detecting means for detecting a leading end of the original film; and control means for varying a feeding amount of the original film by said feeding means after detection of the leading end by said detecting means to conform with the size information from said size means, wherein the original film is set in a regular projecting position for each size irrespective of the size of the original film.

19. An overhead projector according to claim 15 or 16, wherein the proper location is a central location between adjacent marks.

20. An overhead projector according to claim 17 or 18, wherein the regular position is a central position of the projecting position.

21. A projection original film feeding apparatus, comprising:

feeding means for feeding an original film to a projecting position, said feeding means having a belt-like member for conveying the original film, said belt-like member having marks to be detected to determine a feeding amount of the original film;

size means for outputting size information of the original film;

control means for moving said belt-like member in advance by a predetermined amount conforming with size information from said size means; and supply means for supplying the original film to said belt-like member controlled by said control means, wherein the original film is set at a proper location with respect to the marks for each size irrespective of the size of the original film.

22. A projection original film feeding apparatus according to claim 21, wherein said size means outputs information regarding a longitudinal original or a lateral original.

23. A projection original film feeding apparatus, comprising:

feeding means for feeding an original film to a projecting position, said feeding means including a belt-like member for conveying the original film, said belt-like member having marks to be detected to determine a feeding amount of the original film;

size means for outputting size information of the original film;

supply means for supplying the original film to said belt-like member in a predetermined timing independent from the size of the original film; and control means for correcting mark detection information conforming with the size information from said size means and varying a moving amount of said belt-like member, wherein the original film is set in a regular projecting position for each size irrespective of the size of the original film.

24. A projection original film feeding apparatus, comprising:

feeding means for feeding the original film to a projecting position, said feeding means including a belt-like member for conveying the original film, said belt-like member having marks to be detected to determine a feeding amount of the original film;

size means for outputting size information of the original film;

detecting means for detecting a leading end of the original film; and control means for varying a feeding amount of the original film by said feeding means after detection of the leading end by said detecting means to conform with the size information from said size means, wherein the original film is set in a regular projecting position for each size irrespective of size the original film.

* * * * *

UNITED STATES PATENT AND TRADEMARK OFFICE
CERTIFICATE OF CORRECTION

PATENT NO. : 5,444,506
DATED : August 22, 1995
INVENTOR(S) : Nakazawa et al.

It is certified that error appears in the above-indentified patent and that said Letters Patent is hereby corrected as shown below: Title page, item:

[57] ABSTRACT:

Line 6, "feed" should read --feed of--.

COLUMN 16:

Line 23, "on the original film" should be deleted.

COLUMN 18:

Line 47, "is" should read --is a--.

COLUMN 20:

Line 64, "of size" should read --of the size of--.

Signed and Sealed this

Thirtieth Day of January, 1996

Attest:

BRUCE LEHMAN

Attesting Officer        Commissioner of Patents and Trademarks